US011460436B2

United States Patent
Yoshida

(10) Patent No.: US 11,460,436 B2
(45) Date of Patent: Oct. 4, 2022

(54) COMPONENT ANALYSIS METHOD AND COMPONENT ANALYSIS DEVICE

(71) Applicant: ARKRAY, Inc., Kyoto (JP)

(72) Inventor: Jin Yoshida, Kyoto (JP)

(73) Assignee: ARKRAY, INC., Kyoto (JP)

( * ) Notice: Subject to any disclaimer, the term of this patent is extended or adjusted under 35 U.S.C. 154(b) by 446 days.

(21) Appl. No.: 16/545,104

(22) Filed: Aug. 20, 2019

(65) Prior Publication Data
US 2020/0072790 A1   Mar. 5, 2020

(30) Foreign Application Priority Data

Aug. 23, 2018 (JP) .............................. JP2018-155960

(51) Int. Cl.
*G01N 27/447* (2006.01)
*G01N 21/25* (2006.01)
*G01N 21/31* (2006.01)

(52) U.S. Cl.
CPC ..... *G01N 27/44721* (2013.01); *G01N 21/255* (2013.01); *G01N 21/31* (2013.01)

(58) Field of Classification Search
None
See application file for complete search history.

(56) References Cited

U.S. PATENT DOCUMENTS

| 2010/0116660 A1 | 5/2010 | Tanaka et al. |
| 2014/0257712 A1 | 9/2014 | Mito et al. |
| 2016/0077053 A1* | 3/2016 | Onuma ............ G01N 27/44791 204/453 |

FOREIGN PATENT DOCUMENTS

| JP | H01-112458 U | 7/1989 |
| JP | 2006-177980 A | 7/2006 |
| JP | 2014-134556 A | 7/2014 |
| JP | 2014-211393 A | 11/2014 |
| JP | 2018-072336 A | 5/2018 |

OTHER PUBLICATIONS

Extended European Search Report issued in corresponding European Patent Application No. 19193144.3 dated Jan. 22, 2020.
Office Action issued in corresponding Japanese Patent Application No. 2018-155960 dated Nov. 24, 2021.

* cited by examiner

*Primary Examiner* — J. Christopher Ball
(74) *Attorney, Agent, or Firm* — Morgan, Lewis & Bockius LLP

(57) ABSTRACT

The present disclosure provides component analysis methods including a measurement process and an analysis process.

20 Claims, 20 Drawing Sheets

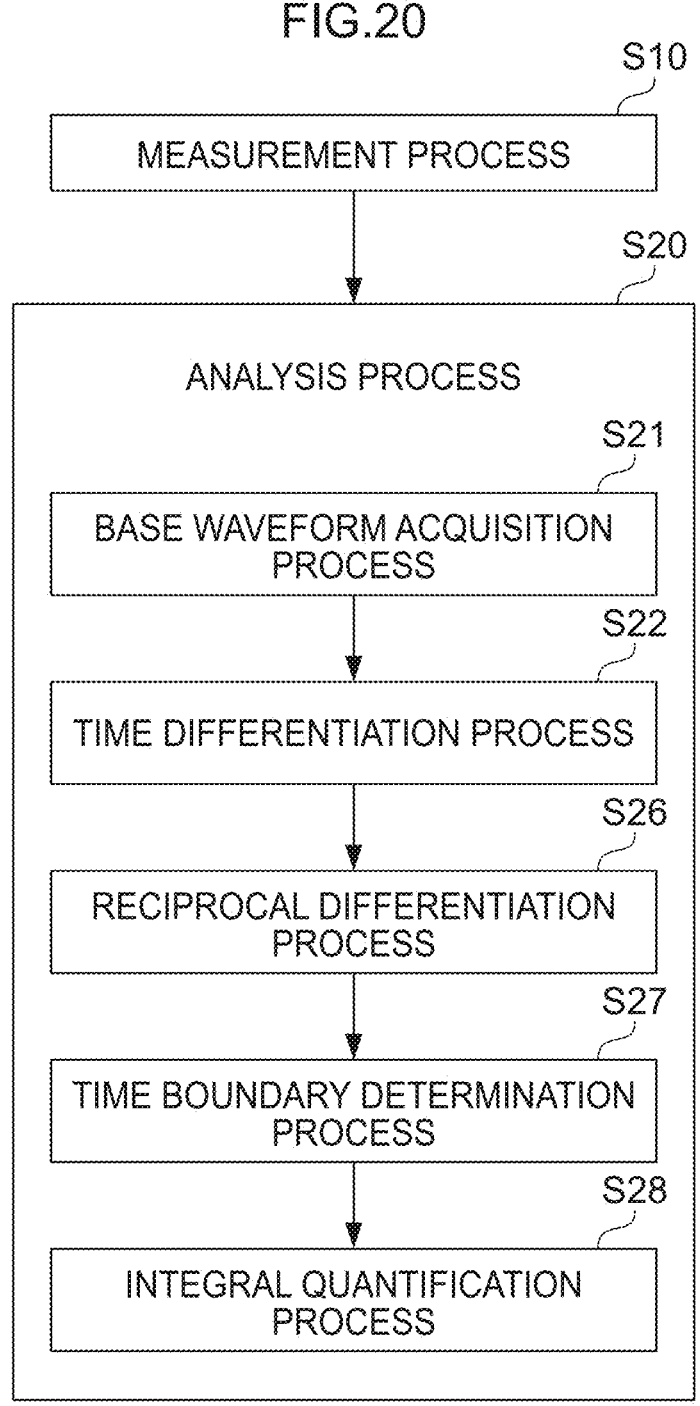

COMPONENT ANALYSIS METHOD AND COMPONENT ANALYSIS DEVICE

CROSS-REFERENCE TO RELATED APPLICATION

This application claims priority under 35 USC 119 from Japanese Patent Application No. 2018-155960, filed on Aug. 23, 2018, the disclosure of which is incorporated by reference herein.

BACKGROUND

Technical Field

The present disclosure relates to a component analysis method and a component analysis device that use continuous sample introduction.

Related Art

In a component analysis system using continuous sample introduction such as capillary electrophoresis, there is technology in which a curve as a base waveform is plotted with detection data such as optical absorbance acquired by a detector along a vertical axis and time along the horizontal axis, and component analysis is performed using a differentiated waveform such as an electropherogram that is obtained by differentiating the base waveform with respect to time.

Each peak appearing in the differentiated waveform corresponds to a component contained in the introduced sample. Moreover, each component can be identified by a time difference when a top of each peak appears. Furthermore, an area occupied by each of the peaks in the differentiated waveform is employed as an indicator of an amount of each corresponding component in the sample. For example, a differentiated waveform in a hemoglobin assay system obtained by continuous sample introduction with a blood sample shows a shape such as that illustrated in Japanese Patent Application Laid-Open (JP-A) No. 2018-72336.

In a component analysis system using continuous sample introduction such as in capillary electrophoresis, components are identified by the peaks appearing in the differentiated waveform obtained by differentiating the optical absorbance curve along the time axis as described above, and the components are relatively quantified by the area occupied by the portions at these peaks in the differentiated waveform. In such a system, a valley portion (hereafter referred to as "bottom") given between the peaks is often used as the boundary between the peaks. However, such a bottom is frequently indistinct. In particular, when two peaks are merged, a lower peak is sometimes absorbed in a higher peak, it is difficult to distinguish between the two peaks and, in such a case, it is difficult or impossible to identify the bottom.

SUMMARY

An exemplary embodiment of the present disclosure is a component analysis method including a measurement process in which a sample solution that is continuously introduced into a flow path is separated into a plurality of components inside the flow path and is optically measured over time at a measurement position on the flow path to obtain optical measurement values, and an analysis process in which the plurality of components contained in a sample is analyzed based on the optical measurement values. The analysis process includes a base waveform acquisition process in which a base waveform is acquired by plotting the optical measurement values along a time axis on a two-dimensional plane, a measurement value differentiation process in which a measurement value differentiated waveform is acquired, which is a waveform obtained by differentiating the base waveform along an axis of the optical measurement values orthogonal to the time axis, and a measurement value boundary determination process in which the optical measurement values corresponding to peaks in the measurement value differentiated waveform are determined to be separation boundaries between adjacent components of the plural components.

The exemplary embodiment of the present disclosure enables, in a component analysis system using continuous sample introduction, a boundary to be definitively determined even in cases in which it is difficult to determine a distinct boundary between two peaks in a differentiated waveform.

BRIEF DESCRIPTION OF THE DRAWINGS

Exemplary embodiments will be described in detail based on the following figures, wherein:

FIG. 20 is a flowchart that schematically represents a component analysis method of the fifth aspect;

FIG. 21A illustrates a case of a low concentration sample at the ambient temperature of 23° C., FIG. 21B illustrates a case of a high concentration sample at the ambient temperature of 23° C., FIG. 21C illustrates a case of a low concentration sample at the ambient temperature of 8° C., and FIG. 21D illustrates a case of a high concentration sample at the ambient temperature of 8° C.; FIG. 22A illustrates a case of a low concentration sample at the ambient temperature of 23° C., FIG. 22B illustrates a case of a high concentration sample at the ambient temperature of 23° C., FIG. 22C illustrates a case of a low concentration sample at the ambient temperature of 8° C., and FIG. 22D illustrates a case of a high concentration sample at the ambient temperature of 8° C.

DETAILED DESCRIPTION

Explanation follows regarding exemplary embodiments of the present disclosure, with reference to the drawings as appropriate.

Component Analysis System

Figure 1:
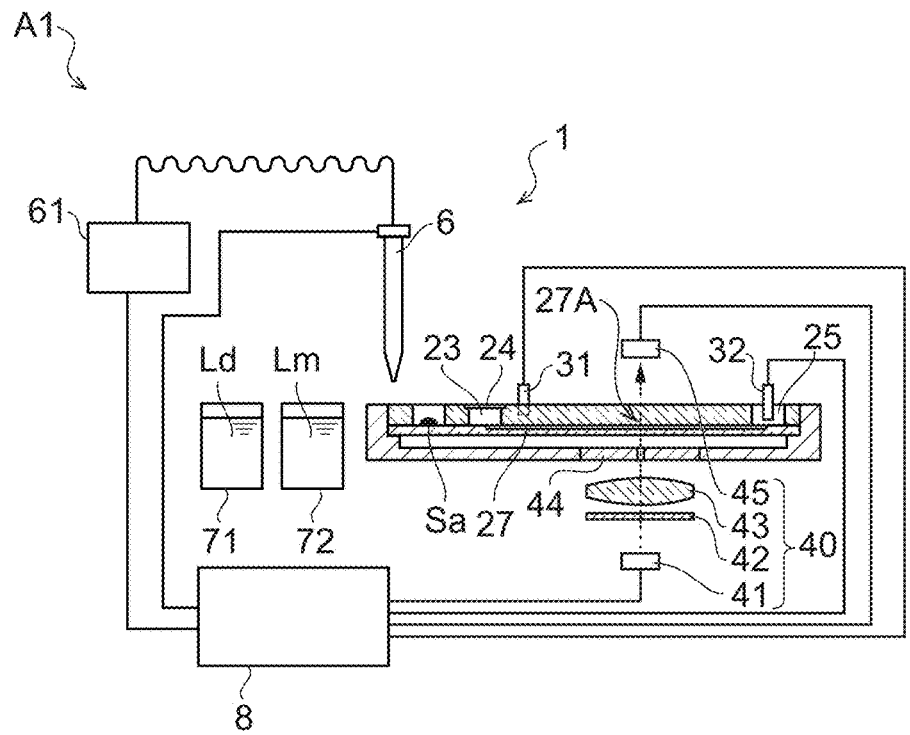
FIG. 1 is a system schematic diagram that illustrates a component analysis system that can be used to execute a component analysis method of an exemplary embodiment.

FIG. 1 illustrates a schematic configuration of a component analysis system A1 in which a component analysis method according to the present exemplary embodiment can be executed. The component analysis system A1 is configured including a component analysis device 1 and an analysis chip 2. The component analysis system A1 is a system for executing an analysis method using capillary electrophoresis with a sample Sa as a target. The sample Sa may include any component that is able to be analyzed by capillary electrophoresis, and a property of the sample Sa may be liquid, solid, or gas as long as the sample Sa is soluble to a medium. Explanation follows regarding an example in the present exemplary embodiment in which the sample Sa is blood collected from a human body.

Examples of components to be analyzed among the components contained in the sample Sa include hemoglobin (Hb), albumin (Alb), globulin ($\alpha 1$, $\alpha 2$, $\beta$, and $\gamma$-globulin), fibrinogen, or the like. Examples of the hemoglobin referred to above include several types of hemoglobin, such as normal hemoglobin (HbA), hemoglobin variants (HbA1c, HbC, HbD, HbE, HbS, etc.), fetal hemoglobin (HbF), and the like. These components are preferably analyzed using capillary electrophoresis since mutations in the amino acids as configuration elements thereof are readily reflected in protein molecules electrically. In the component analysis system A1 according to the present exemplary embodiment, separation boundaries between a plurality of components are determined, which are a plurality of hemoglobin variants as a plurality of mutants of the same kinds of proteins.

Depending on the components subjected to analysis, the sample may be pre-processed with suitable reagents, or may be subjected to preliminary separation processing using a different method (such as, for example, a chromatography method).

Figure 2:
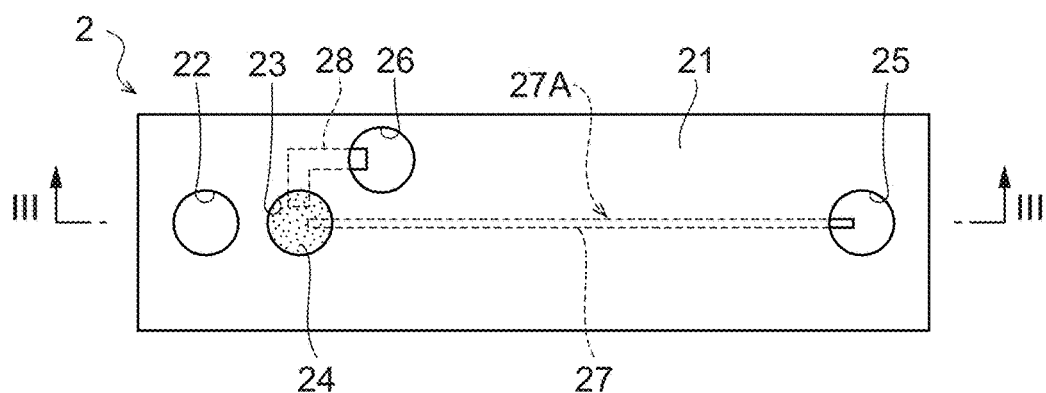
FIG. 2 is a plan view that illustrates an analysis chip used in the analysis system of FIG. 1.
Figure 3:
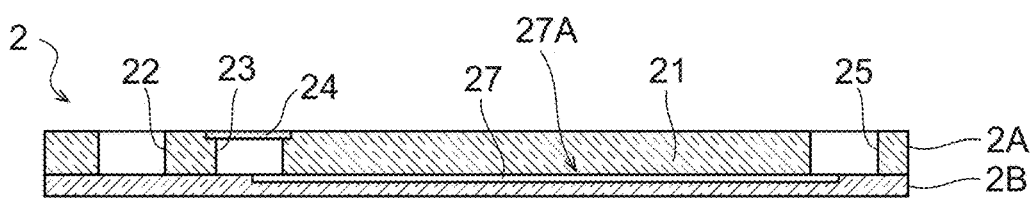
FIG. 3 is a cross-section that is taken along line in FIG. 2.

The analysis chip 2 holds the sample Sa, and provides a place for performing analysis on the target sample Sa in a state in which the analysis chip 2 has been loaded in the component analysis device 1. In the present exemplary embodiment, the analysis chip 2 is configured by a so-called disposable type of analysis chip, which is intended to be disposed of after a single analysis has been completed. As illustrated in FIG. 2 and FIG. 3, the analysis chip 2 includes a body 21, a mixing reservoir 22, an introduction reservoir 23, a filter 24, a discharge reservoir 25, an electrode reservoir 26, a flow path 27, and a communication flow path 28. FIG. 2 is a plan view of the analysis chip 2, and FIG. 3 is a cross-section taken along III-III in FIG. 2. Note that the analysis chip 2 is not limited to the disposable type, and may be a chip that is used for several analyses. Moreover, the component analysis system according to the present exemplary embodiment is not limited to a configuration in which the analysis chip 2 is provided as a separate body to be loaded into the component analysis device 1. The component analysis system according to the present invention may be configured with a functional part that accomplishes similar functionality to that of the analysis chip 2 and is built into the component analysis device 1.

The body 21 is a base for the analysis chip 2. The material of the body 21 is not particularly limited and examples thereof include glass, fused silica, plastic, and the like. In the present exemplary embodiment, the body 21 is formed from separate bodies, these being an upper portion 2A and a lower portion 2B illustrated in FIG. 3, in a configuration in which the upper portion 2A and the lower portion 2B are joined to each other. Note that there is no limitation thereto, and for example, the body 21 may be formed as a single integrated unit.

The mixing reservoir 22 is a site where the sample Sa and a diluent Ld are mixed. The mixing reservoir 22 is, for example, configured as a recess open to the upper side by a through hole formed in the upper portion 2A of the body 21. The introduction reservoir 23 is a reservoir into which a sample solution is introduced which is obtained from mixing the sample Sa and the diluent Ld together in the mixing reservoir 22. The introduction reservoir 23 is, for example, configured as a recess open to the upper side by a through hole formed in the upper portion 2A of the body 21.

The filter 24 is provided to an opening of the introduction reservoir 23, with the opening serving as an example of an introduction path to the introduction reservoir 23. The specific configuration of the filter 24 is not limited, and a preferable example thereof is a cellulose acetate membrane filter (manufactured by ADVANTEC and having a 0.45 μm pore diameter).

The discharge reservoir 25 is a reservoir that is positioned on the downstream side of the flow path 27. The discharge reservoir 25 is, for example, configured as a recess open to the upper side by a through hole formed in the upper portion 2A of the body 21. The electrode reservoir 26 is a reservoir into which an electrode 31 is inserted in capillary electrophoresis. The electrode reservoir 26 is, for example, configured as a recess open to the upper side by a through hole formed in the upper portion 2A of the body 21. The communication flow path 28 connects the introduction reservoir 23 and the electrode reservoir 26 together, and configures a contiguous path between the introduction reservoir 23 and the electrode reservoir 26.

The flow path 27 is formed as a capillary tube connecting the introduction reservoir 23 and the discharge reservoir 25 together, and is a place where electroosmotic flow (EOF) occurs during capillary electrophoresis. The flow path 27 is, for example, configured as a groove formed in the lower portion 2B of the body 21. Note that recesses or the like may be formed in the body 21 as appropriate to promote irradiation of light onto the flow path 27 and to promote output of light that has passed through the flow path 27. The size of the flow path 27 is not particularly limited, and as an example thereof, the flow path 27 has a width of 25 μm to 100 μm, a depth of 25 μm to 100 μm, and a length of 5 mm to 150 mm. The overall size of the analysis chip 2 is set as appropriate according to the size of the flow path 27 and the size, placement, and so on, of the mixing reservoir 22, the introduction reservoir 23, the discharge reservoir 25, and the electrode reservoir 26.

Note that the analysis chip 2 configured as described above is merely an example, and any analysis chip with a configuration that enables component analysis to be performed by capillary electrophoresis may be appropriately employed therefor.

The component analysis device 1 performs analysis processing on the sample Sa, in a state in which the analysis chip 2 spotted with the sample Sa is loaded in the component analysis device 1. The component analysis device 1 includes an electrode 31, an electrode 32, a light source 41, an optical filter 42, a lens 43, a slit 44, a detector 45, a dispenser 6, a pump 61, a diluent reservoir 71, a migration liquid reservoir 72, and a control section 8. Note that the light source 41, the optical filter 42, the lens 43, and the detector 45 configure a measurement section 40 in the present exemplary embodiment.

The electrode 31 and the electrode 32 are for applying a predetermined voltage to the flow path 27 during capillary electrophoresis. The electrode 31 is inserted into the electrode reservoir 26 of the analysis chip 2, and the electrode 32 is inserted into the discharge reservoir 25 of the analysis chip 2. The voltage applied to the electrode 31 and the electrode 32 is not particularly limited, and may, for example, be from 0.5 kV to 20 kV.

The light source 41 is a part that emit light to measure optical absorbance as an optical measurement value during capillary electrophoresis. The light source 41 is provided, for example, with an LED chip that emits light of a predetermined wavelength range. The optical filter 42 attenuates light of predetermined wavelengths in the light from the light source 41 and transmits the light of other wavelengths therein. The lens 43 is focuses light that is transmitted through the optical filter 42 onto an analysis site of the flow path 27 of the analysis chip 2. The slit 44 excludes excess light from the light focused using the lens 43, which might otherwise cause scattering and the like.

The detector 45 receives light from the light source 41 that is transmitted through the flow path 27 of the analysis chip 2, and is configured including a photodiode, a photo IC, or the like.

In this manner, a light path is a route through which the light emitted by the light source 41 to the detector 45. An optical measurement value for the solution (namely, either a sample solution, a migration liquid, or a mixture solution thereof) flowing through the flow path 27 is measured at a measurement position 27A, which is the position where this light path intersects with the flow path 27. Namely, the optical measurement value of the sample solution is measured by the measurement section 40 at the measurement position 27A on the flow path 27. The optical measurement value may, for example, be optical absorbance. Optical absorbance represents a degree to which light in the light path is absorbed by the solution flowing through the flow path 27, and is expressed as an absolute value of a value for the common logarithm of a ratio of incident light intensity to transmitted light intensity. In such cases, a generic spectrophotometer may be employed as the detector 45. Note that any optical measurement value, such as the value of the simple transmitted light intensity, may be used in the present invention instead of the optical absorbance. The following explanation describes an example in which optical absorbance is used as the optical measurement value.

The dispenser 6 dispenses desired amounts of the diluent Ld, a migration liquid Lm, and the sample solution, and the dispenser 6 includes a nozzle, for example. The dispenser 6 can be freely moved between a plurality of predetermined positions in the component analysis device 1 using a drive mechanism, not illustrated in the drawings. The pump 61 is a draw source to the dispenser 6 and a purge source from the dispenser 6. Moreover, the pump 61 may be used as a draw source and a purge source for ports, not illustrated in the drawings, provided to the component analysis device 1. Such ports may be employed to fill the migration liquid Lm or the like. Dedicated pumps may also be provided therefor, separate to the pump 61.

The diluent reservoir 71 is a reservoir for storing the diluent Ld. The diluent reservoir 71 may be a reservoir that is permanently installed to the component analysis device 1, or may be a container filled with a predetermined amount of the diluent Ld and loaded into the component analysis device 1. The migration liquid reservoir 72 is a reservoir for storing the migration liquid Lm. The migration liquid reservoir 72 may be a reservoir that is permanently installed to the component analysis device 1, or may be a container filled with a predetermined amount of the migration liquid Lm and loaded into the component analysis device 1.

The diluent Ld is mixed with the sample Sa to produce the sample solution. The main agent of the diluent Ld is not particularly limited, and examples thereof include water and physiological saline. A preferable example of the diluent Ld is a liquid including components similar to those of the migration liquid Lm, described later. Moreover, additives may also be added as necessary to the diluent Ld in addition to the main agent.

The migration liquid Lm is filled into the discharge reservoir 25 and the flow path 27 in an analysis process S20 employing electrophoresis, and is a medium to generate electroosmotic flow during capillary electrophoresis. Although the migration liquid Lm is not particularly limited, an acid is preferably used therefor. The acid is, for example, citric acid, maleic acid, tartaric acid, succinic acid, fumaric acid, phthalic acid, malonic acid, or malic acid. The migration liquid Lm preferably also includes a weak base. The weak base is, for example, arginine, lysine, histidine, tris, or the like. The pH of the migration liquid Lm is, for example, in a range of pH 4.5 to pH 6. A type of a buffer in the migration liquid Lm is MES, ADA, ACES, BES, MOPS, TES, HEPES, or the like. Similar to the above explanation regarding the diluent Ld, additives may also be added to the migration liquid Lm as necessary.

Figure 4:
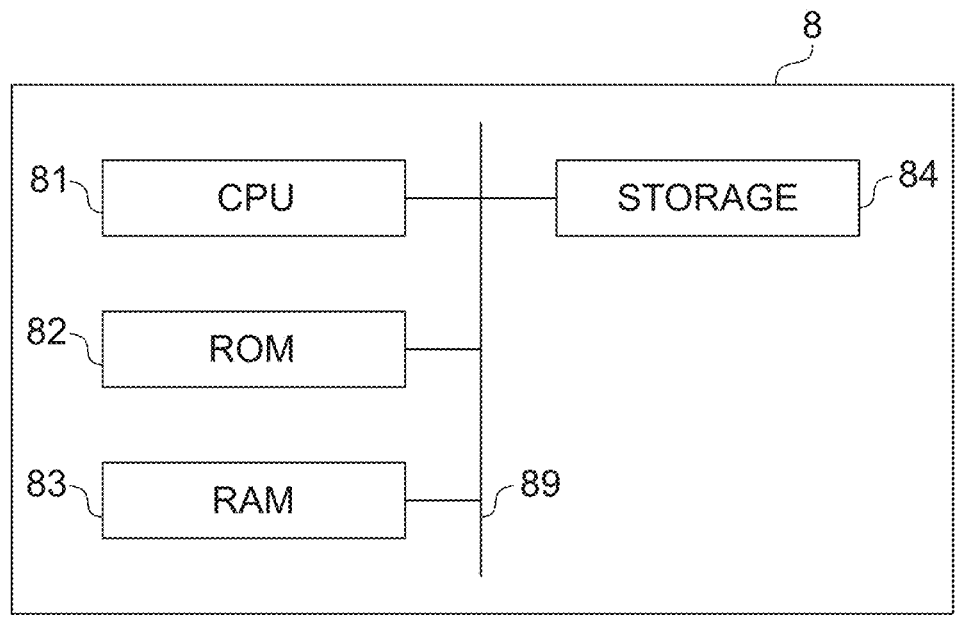
FIG. 4 is a block diagram that illustrates a hardware configuration of a control section.

The control section 8 controls each section in the component analysis device 1. The control section 8 includes, as illustrated in a hardware configuration in FIG. 4, a central processing unit (CPU) 81, read only memory (ROM) 82, random access memory (RAM) 83, and storage 84. These parts of the configuration are connected together so as to be capable of communicating with each other through a bus 89.

The CPU 81 is a central processing unit that executes various programs to control each section. Namely, the CPU 81 reads a program from the ROM 82 or the storage 84, and executes the program using the RAM 83 as a working area.

The CPU 81 performs control of the configuration shown above and various computation processing according to the program recorded in the ROM 82 or the storage 84.

The ROM 82 stores various programs and various data. The RAM 83 serves as a working area to temporarily store programs or data. The storage 84 is configured by a hard disk drive (HDD), solid state drive (SSD), or flash memory, and is stored with various programs including an operating system, and various data. In the present exemplary embodiment, a program to execute the component analysis method according to the present exemplary embodiment and various data is stored in the ROM 82 or the storage 84.

Figure 5:
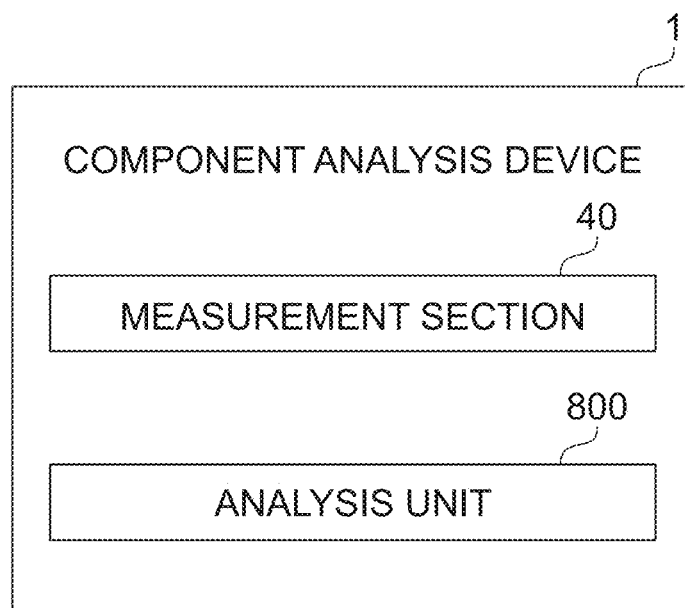
FIG. 5 is a block diagram that represents a functional configuration of a component analysis device.

In order to execute the component analysis method according to the present exemplary embodiment, the component analysis device 1 executes various functions such as those illustrated in FIG. 5 using the hardware resources and configuration parts described above. These functions include, as well as the function of the measurement section 40, the function of an analysis unit 800 to analyze a plurality of components contained in the sample Sa based on the optical measurement values obtained by measuring the sample solution optically over time with the measurement section 40. These functions are described later.

First Aspect

A component analysis method of the first aspect of the present disclosure includes: a measurement process S10 and an analysis process S20. In the measurement process S10, a sample solution that is continuously introduced into a flow path 27 is separated into a plurality of components inside the flow path 27 and is optically measured over time at a measurement position 27A on the flow path 27 to obtain optical measurement values. In the analysis process S20, the plurality of components contained in a sample Sa is analyzed based on the optical measurement values. The analysis process S20 includes: a base waveform acquisition process S21 in which a base waveform is acquired by plotting the optical measurement values along a time axis on a two-dimensional plane; a measurement value differentiation process S23 in which a measurement value differentiated waveform is acquired, which is a waveform obtained by differentiating the base waveform along an axis of the optical measurement values orthogonal to the time axis; and a measurement value boundary determination process S24 in which the optical measurement values corresponding to peaks in the measurement value differentiated waveform are determined to be separation boundaries between adjacent components of the plural components.

A component analysis device 1 of the present aspect includes: a flow path 27 into which a sample solution is continuously introduced; a measurement section 40 that optically measures the sample solution over time, which is separated into a plurality of components inside the flow path 27, at a measurement position 27A on the flow path 27 to obtain optical measurement values; and an analysis unit 800 that analyzes the plurality of components contained in a sample Sa based on the optical measurement values. The analysis unit 800 includes: a base waveform acquisition section 801 that acquires a base waveform by plotting the optical measurement values along a time axis on a two-dimensional plane; a measurement value differentiation section 803 that acquires a measurement value differentiated waveform that is a waveform obtained by differentiating the base waveform along an axis of the optical measurement values orthogonal to the time axis; and a measurement value boundary determination section 804 that determines optical measurement values corresponding to peaks in the measurement value differentiated waveform to be separation boundaries between adjacent components into the plural components.

Figure 6:
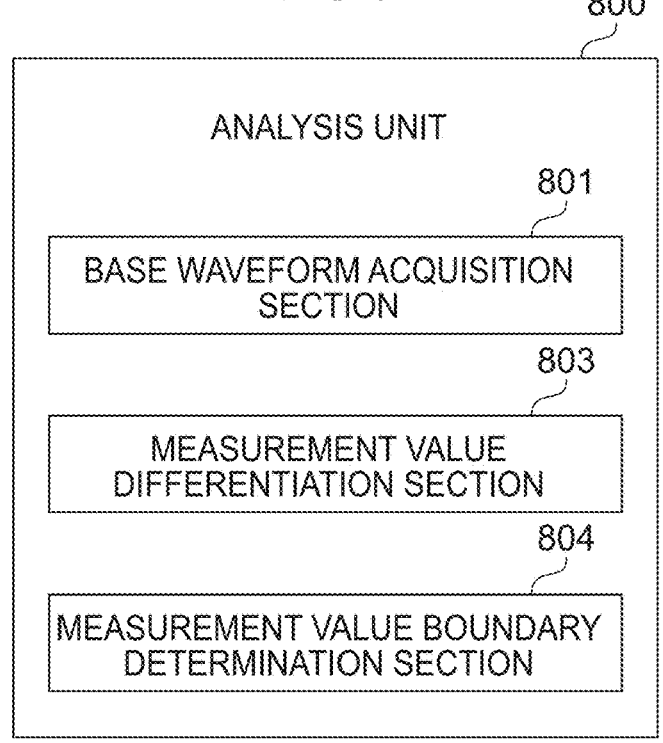
FIG. 6 is a block diagram that represents a functional configuration of an analysis unit of a first aspect.

A functional configuration of the analysis unit 800 of the present aspect is illustrated in FIG. 6. Explanation follows regarding the component analysis method of the present aspect, with reference to a flowchart of FIG. 7.

Figure 7:
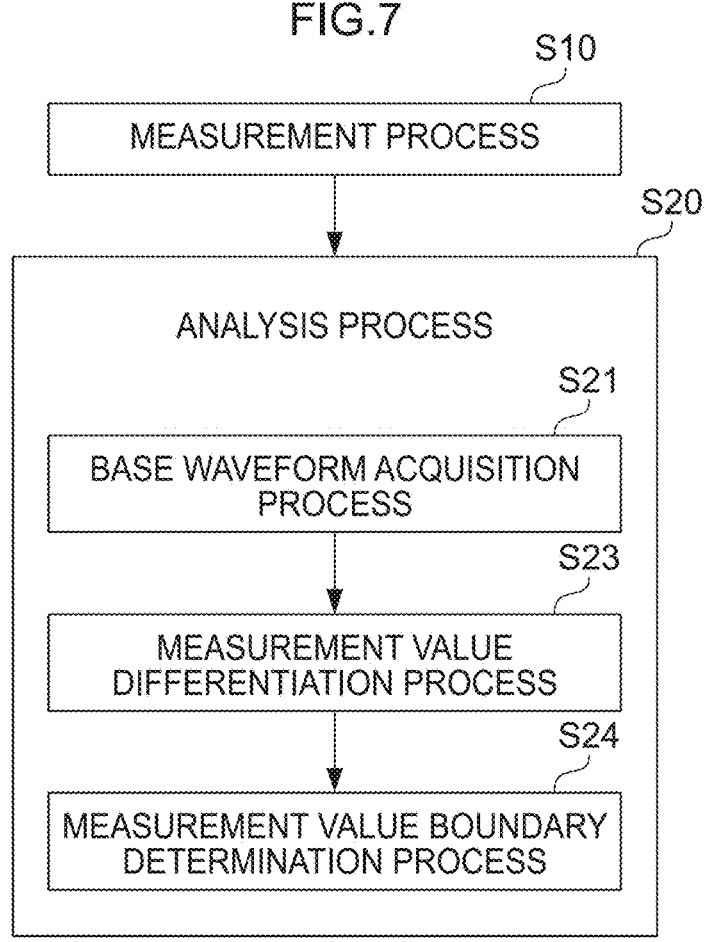
FIG. 7 is a flowchart that schematically illustrates a component analysis method of the first aspect.

In a measurement process S10 illustrated in FIG. 7, the sample solution is continuously introduced into the flow path 27, the sample solution is separated into the plurality of components in the flow path 27 by application of a voltage, and an optical measurement value is obtained for when the sample solution arrives at the measurement position 27A provided on a way along the flow path 27 by the measurement section 40. Specifically, the electrodes 31, 32 are respectively mounted at an upstream side and a downstream sides of the flow path 27 and the sample solution is applied with the voltage therebetween, and is thereby subjected to electrophoresis in so-called capillary electrophoresis. In other words, the optical measurement values are obtained using capillary electrophoresis in which a voltage is applied to the sample solution that is continuously introduced into a capillary tube as the flow path 27 so as to separate the sample solution into the plurality of components.

For example, when a target component for analysis is hemoglobin as described above, then placing a negative electrode as the electrode 31 at the upstream side of the flow path 27 and placing a positive electrode as the electrode 32 at the downstream side of the flow path 27 results in the analysis target component being migrated toward the electrode 32 as the positive electrode due to surfaces of molecules of the hemoglobin being negatively charged. When this occurs, an electrical migration speed varies according to a charged state of the molecule surface. Namely, the stronger a negative charge on the molecule surface is, the faster the migration speed is. Thus, when the sample solution is introduced into the flow path 27, the component of a higher migration speed earlier arrives at the measurement position 27A.

Then, at a time when the component of a lower migration speed arrives at the measurement position 27A, the component of a higher migration speed, which is derived from the sample solution introduced later, also arrives at the same time at the measurement position 27A. Namely, once the component of a higher migration speed arrives at the measurement position 27A in the flow path 27, the component continues to arrive at the measurement position 27A as long as the sample solution is continuously introduced into the flow path 27. Moreover, the component of a lower migration speed arrives at the measurement position 27A later. However, once the component of a lower migration speed arrives at the measurement position 27A, the component also continues to arrive at the measurement position 27A as long as the sample solution is continuously introduced into the flow path 27.

In other words, the component of a higher migration speed arrives at the measurement position 27A earlier, and thereafter each the component of a lower migration speed arrives at the measurement position 27A cumulatively. Therefore, the optical absorbance measured as the optical measurement value of the sample solution by the measurement section 40 at the measurement position 27A chronologically shows a cumulative and monotonous increase.

Figure 8:
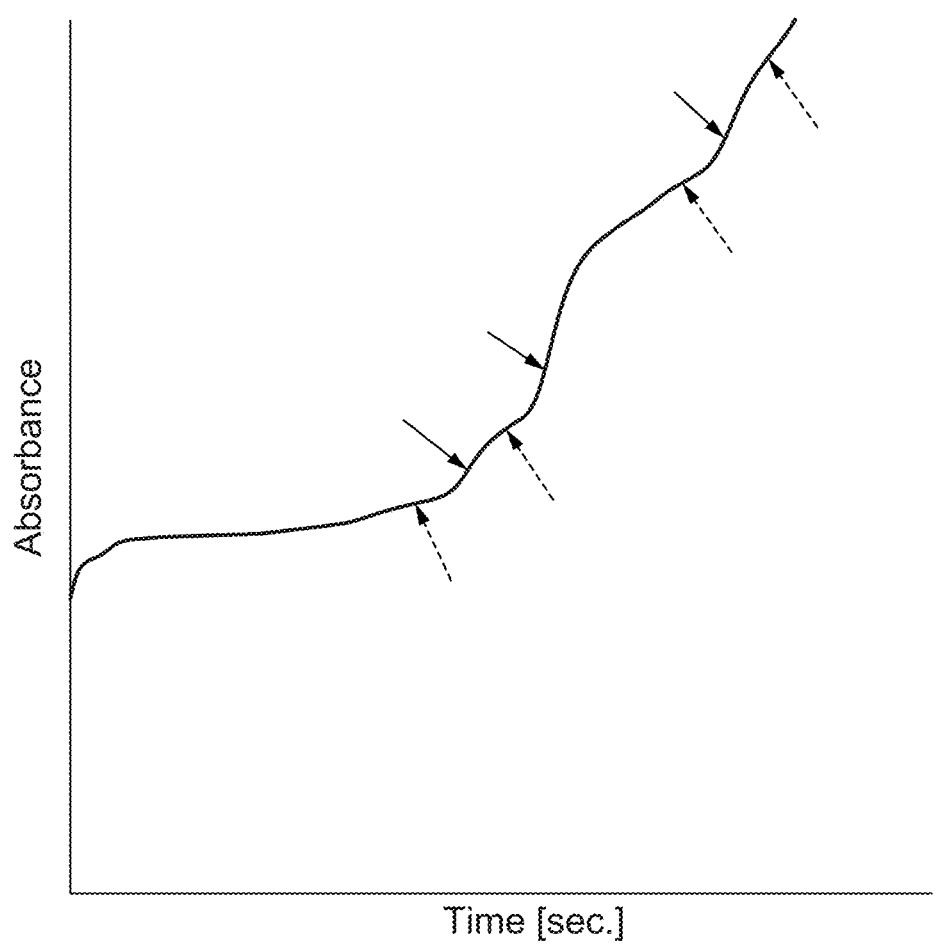
FIG. 8 illustrates an example of a base waveform as a solid line.

In a base waveform acquisition process S21 in the analysis process S20 illustrated in FIG. 7, a base waveform acquisition section 801 in the analysis unit 800 illustrated in FIG. 6 acquires a base waveform by plotting the optical absorbance values as the optical measurement values along one axis (the Y axis, for example) of a two-dimensional plane against a time axis as another axis (the X axis, for example). The base waveform is, for example, represented as a solid line on a graph such as illustrated in FIG. 8. The optical measurement values in the present aspect may be acquired as data that are capable of being plotted on a two-dimensional plane, and a graph based on such data does not actually need to be drawn. This also similarly applies to other aspects mentioned below. Note that the base waveform may be referred to as a function in which the optical measurement value is plotted with time as a variable.

Viewing this base waveform along the time axis, the portions of high gradient indicated by solid line arrows in FIG. 8 are caused by an increase in the optical measurement value due to a given component arriving at the measurement position 27A for the first time. Moreover, the portions of low gradient indicated by dashed line arrows therein indicate that the next component does not yet arrive at the measurement position 27A. Namely, the portions of high gradient in the base waveform indicate the arrival of components in the sample solution at the measurement position 27A. Such portions of high gradient in the base waveform, as illustrated in a dashed line on a graph in FIG. 9, may be represented by peak waveforms appearing in a waveform obtained by differentiating the base waveform along the time axis (hereinafter referred to as a "time differentiated waveform"). Such peak waveforms may be identified as being caused by each component. Note that on the time axis, a component corresponding to a peak waveform that locates more to the left represents a component of a higher migration speed than that of a component corresponding to a peak waveforms that locates more to the right.

When there are a plurality of peak waveforms in the time differentiated waveform, adjacent two peak waveforms are demarcated by a bottom B, which is a valley portion between the two peak waveforms. The peaks T of the peak waveforms are maximal values in the time differentiated waveform, and correspond to locations in the base waveform where slopes thereof show maximal values. On the other hand, the bottoms B are minimal values in the time differentiated waveform, and corresponding slopes in the base waveform show minimal values. In other words, each portion of a steep slope in the base waveform corresponds to a peak T, and each portion of a gentle slope therein corresponds to a bottom B.

On the other hand, viewing the base waveform illustrated in FIG. 8 along the optical measurement value axis (Y axis), each portion corresponding to a peak T has a gentle slope, and each portion corresponding to a bottom B has a steep slope.

A measurement value differentiation process S23 in the analysis process S20 illustrated in FIG. 7 focuses on this point. Namely, in the measurement value differentiation process S23, a measurement value differentiation section 803 in the analysis unit 800 illustrated in FIG. 6 differentiates the base waveform along the optical measurement value axis, and acquires a measurement value differentiated waveform as illustrated by the dotted line in a graph in FIG. 10.

Figure 10:
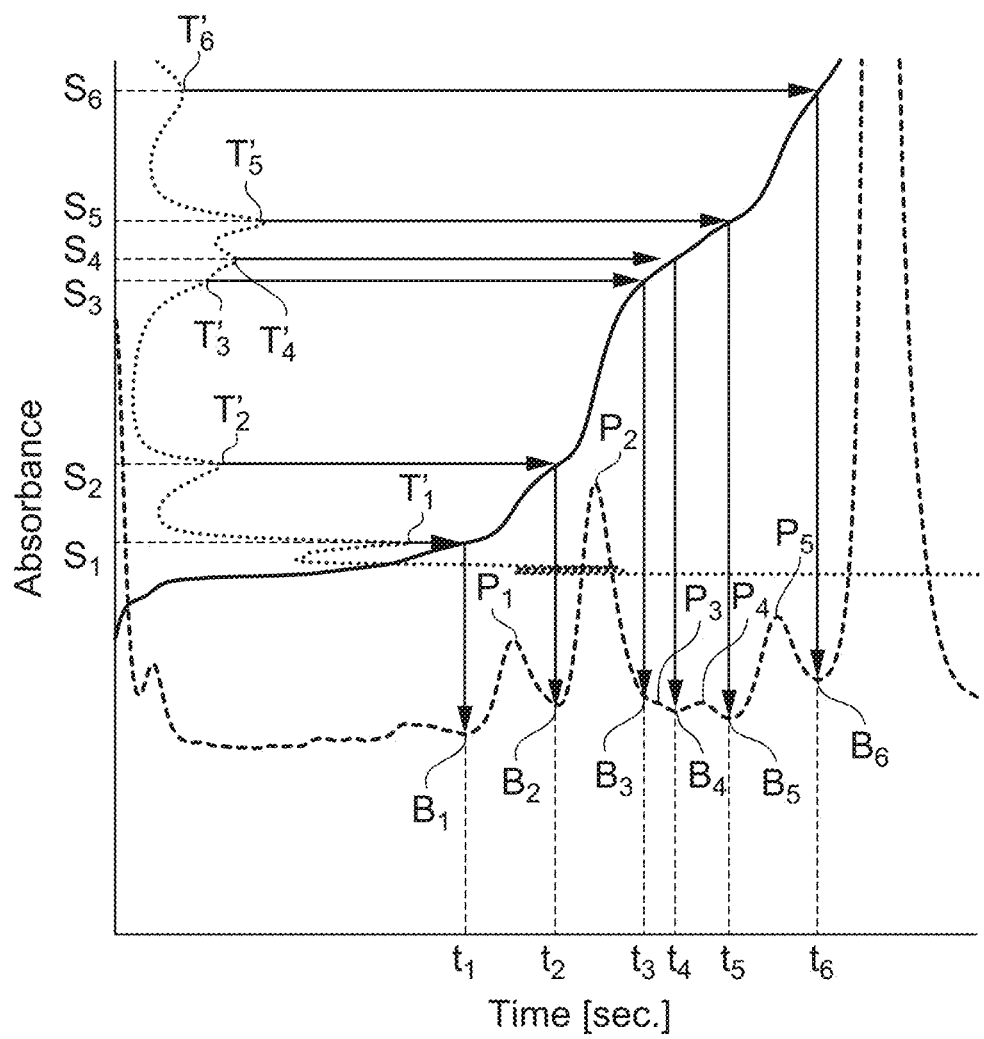
FIG. 10 illustrates an appended dotted line of a measurement value differentiated waveform with respect to the base waveform of FIG. 9.

As illustrated in FIG. 10, the peaks T1' to T6' on the measurement value differentiated waveform respectively correspond to the bottoms B1 to B6 on the time differentiated waveform. Namely, in the measurement value differentiated waveform, peaks and bottoms are taken over with respect to peaks and bottoms in the time differentiated waveform. In other words, the bottoms B1 to B6 in the time differentiated waveform respectively appear clearly as the peaks T1' to T6' in the measurement value differentiated waveform. Note that the measurement value differentiated waveform may be referred to as a function in which the time of the base waveform is differentiated by the optical measurement value as a variable.

Then, in a measurement value boundary determination process S24 in the analysis process S20 illustrated in FIG. 7, a measurement value boundary determination section 804 in the analysis unit 800 illustrated in FIG. 6 determines optical measurement values S1 to S6 respectively corresponding to the peaks T1' to T6' to be separation boundaries between components.

The configuration of the first aspect as described above enables the bottoms B1 to B6, which are hitherto needed to be discriminated as the two ends of a peak waveform in a time differentiated waveform, can be respectively identified as the peaks T1' to T6' in the measurement value differentiated waveform. Then, it is possible for the optical measurement values S1 to S6 corresponding to the peaks T1' to T6' to be respectively determined to be the separation boundaries between the components contained in the sample Sa.

Figure 9:
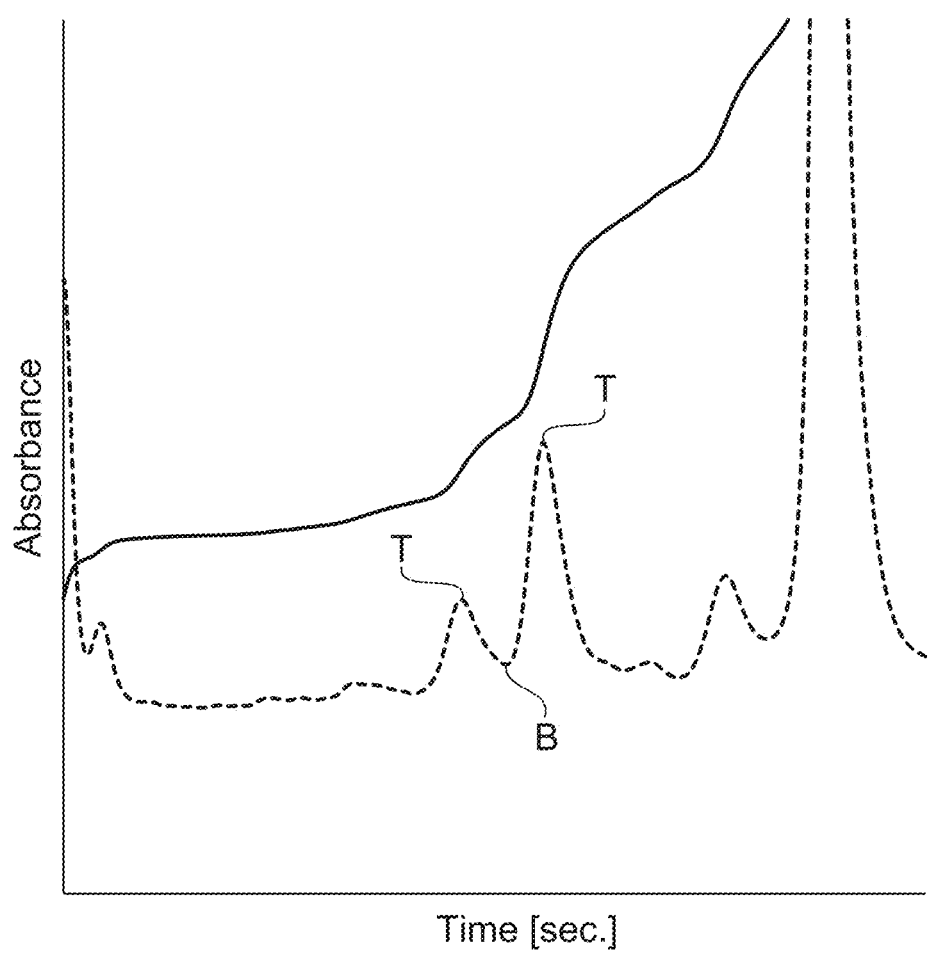
FIG. 9 illustrates a time differentiated waveform with respect to the base waveform of FIG. 8 as a dashed line.

Note that it is not necessary for acquiring the peaks T1' to T6' in the measurement value differentiated waveform to refer to a time differentiated waveform at all. The reason why the time differentiated waveform is referenced in the above explanation and in FIG. 9 and FIG. 10 is merely to explain the meaning of the peaks T1' to T6' in the measurement value differentiated waveform.

Second Aspect

A component analysis method of a second aspect of the present disclosure is an augmented configuration of the component analysis method of the first aspect, wherein the analysis process S20 further includes: a time differentiation process S22 in which a time differentiated waveform is acquired, which is a waveform obtained by differentiating the base waveform along the time axis; and an integral quantification process S28 in which a value obtained by integrating the time differentiated waveform for an integration interval whose both ends are adjacent two integration boundaries, wherein time points corresponding to the separation boundaries are determined to be integration boundaries for the time differentiated waveform, is calculated as a relative amount of each component in the sample Sa corresponding to the integration interval.

The component analysis device 1 in the present aspect is an augmented configuration of the component analysis device 1 of the first aspect, wherein the analysis unit 800 further includes: a time differentiation section 802 that acquires a time differentiated waveform that is a waveform obtained by differentiating the base waveform along the time axis; and an integral quantification section 808 that calculates, a value obtained by integrating the time differentiated waveform for each integration interval whose both end are adjacent two integration boundaries, wherein time points corresponding to the separation boundaries are determined to be integration boundaries for the time differentiated waveform, as a relative amount of each component in the sample Sa corresponding to the integration interval.

Figure 11:
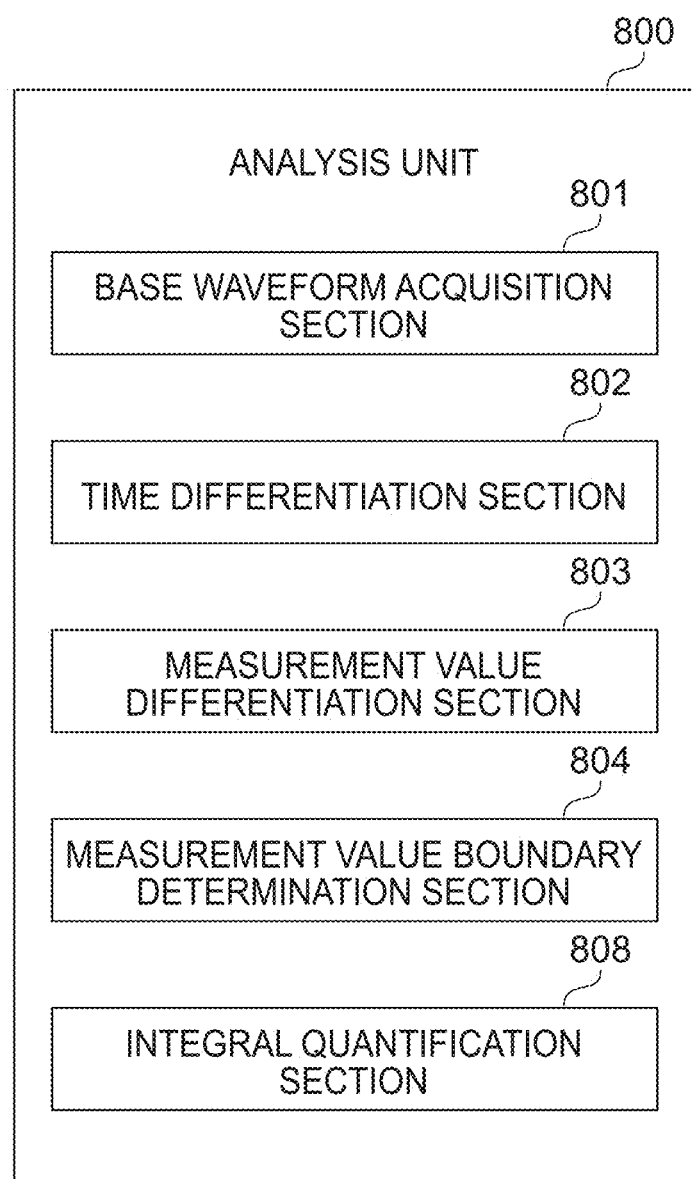
FIG. 11 is a block diagram that illustrates a functional configuration of an analysis unit of a second aspect.

A functional configuration of the analysis unit 800 of the present aspect is illustrated in FIG. 11. Explanation follows regarding the component analysis method of the present aspect, with reference to a flowchart of FIG. 12.

Figure 12:
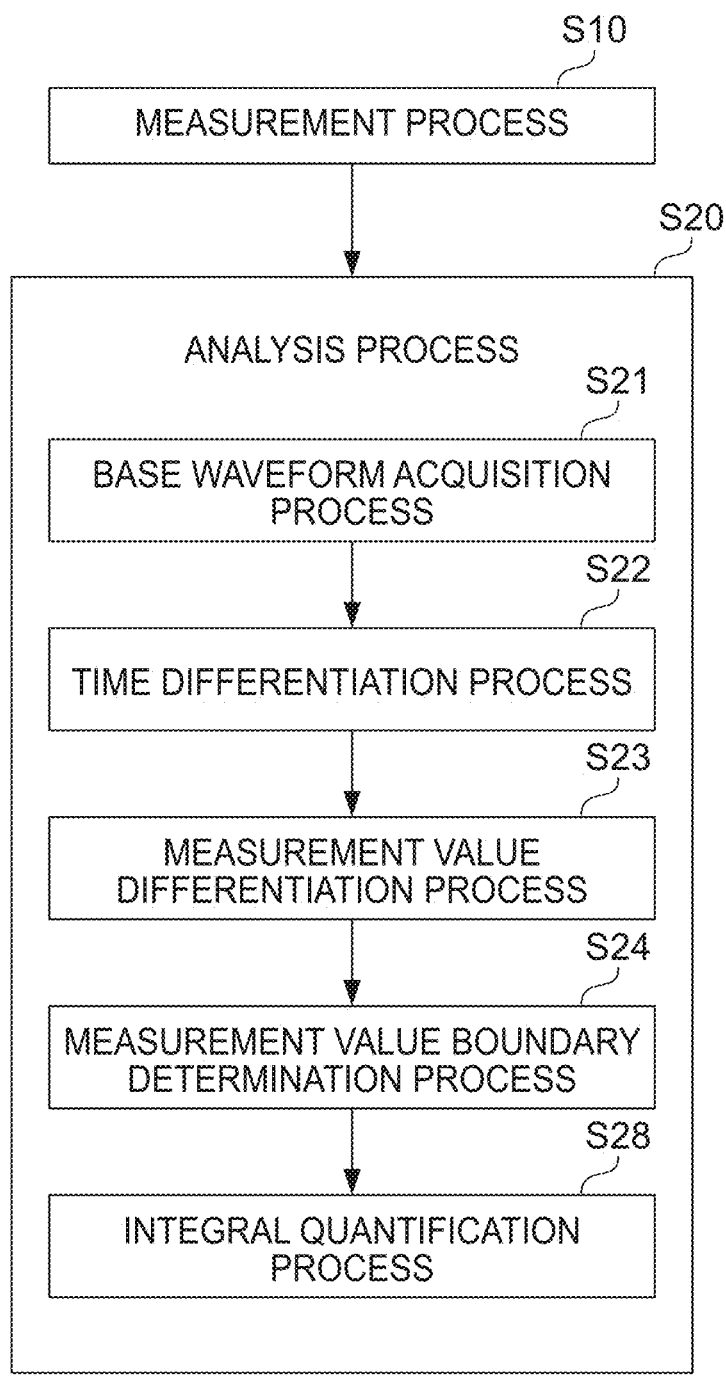
FIG. 12 is a flowchart that schematically illustrates a component analysis method of the second aspect.

The measurement process S10 illustrated in FIG. 12 is similar to that in the first aspect.

In a base waveform acquisition process S21 of an analysis process S20 illustrated in FIG. 12, a base waveform acquisition section 801 of the analysis unit 800 illustrated in FIG. 11 acquires a base waveform by plotting the optical absorbance values as the optical measurement values along one axis (the Y axis, for example) of a two-dimensional plane against a time axis as another axis (the X axis, for example). The base waveform is, for example, represented as a solid line on a graph such as illustrated in FIG. 8. The base waveform acquisition process S21 is similar to that of the first aspect.

Then, in a time differentiation process S22 in the analysis process S20 illustrated in FIG. 12, a time differentiation section 802 of the analysis unit 800 illustrated in FIG. 11 acquires a time differentiated waveform that is a waveform obtained by differentiating the base waveform along the time axis. The time differentiated waveform is represented as the solid line on a graph as illustrated in FIG. 9 and FIG. 10. The relationship between the base waveform and the time differentiated waveform is similar to that of the first aspect as described above.

Then, in a measurement value differentiation process S23 in the analysis process S20 illustrated in FIG. 12, a measurement value differentiation section 803 in the analysis unit 800 illustrated in FIG. 11 differentiates the base waveform along the optical measurement value axis, and acquires a measurement value differentiated waveform as illustrated by the dotted line in the graph of FIG. 10. The measurement value differentiated waveform is also similar to that of the first aspect.

Then in a measurement value boundary determination process S24 in the analysis process S20 illustrated in FIG. 12, a measurement value boundary determination section 804 in the analysis unit 800 illustrated in FIG. 11 determines respective optical measurement values S1 to S6 corresponding to the peaks T1' to T6' in FIG. 10 to be separation boundaries between components.

Then in an integral quantification process S28 in the analysis process S20 illustrated in FIG. 12, an integral quantification section 808 in the analysis unit 800 illustrated in FIG. 11 determines the optical measurement values S1 to S6, which respectively correspond to the peaks T1' to T6' determined in the measurement value boundary determination process S24, to be separation boundaries, and then determines time points t1 to t6, which respectively correspond to the bottoms B1 to B6 in the time differentiated waveform and respectively correspond to the separation boundaries, to be integration boundaries. Then, for each integration interval whose both ends are adjacent two integration boundaries, the time differentiated waveform is integrated to calculate an area occupied by the time differentiated waveform. The value obtained as the area can be regarded as relative amount of the components corresponding to the integration intervals (namely, the component appearing as a peak waveform in the time differentiated waveform).

An important point here is that, although the bottom B3 in FIG. 10 does not always appear as a distinct minimal value in the time differentiated waveform, the peak T3' corresponding thereto in the measurement value differentiated waveform can be distinctly identified as a so-called shoulder peak in the graph. Therefore, the time t3 corresponding to bottom B3 can be distinctly determined to be the integration boundary t3 corresponding to the separation boundary S3. Then, integrating the time differentiated waveform for an integration interval whose both ends are the integration boundary t3 and the adjacent integration boundary t4 enables the relative amount to be calculated for a peak waveform P3 which does not always appear as a distinct peak. Of course, for the other peak waveforms P1, P2, P4 and P5 that do appear as distinct peaks, the respective relative amounts thereof can also be calculated by respectively integrating the time differentiated waveform in a similar manner using respective integration intervals of t1 to t2, t2 to t3, t4 to t5, and t5 to t6.

Third Aspect

A component analysis method of a third aspect of the present disclosure is an augmented configuration of the component analysis method of the first aspect, wherein the analysis process S20 further includes a shift quantification process S25 in which a distance of each interval whose both ends are adjacent two separation boundaries along the axis of the optical measurement values is calculated as a relative amount of each component in the sample Sa corresponding to the interval.

The component analysis device 1 of the present aspect is an augmented configuration of the component analysis device 1 of the first aspect, wherein the analysis unit 800 further includes a shift quantification section 805 that calculates a distance of each interval whose both ends are adjacent two separation boundaries along the axis of the optical measurement values is calculated as a relative amount of each component in the sample Sa corresponding to the respective intervals.

Figure 13:
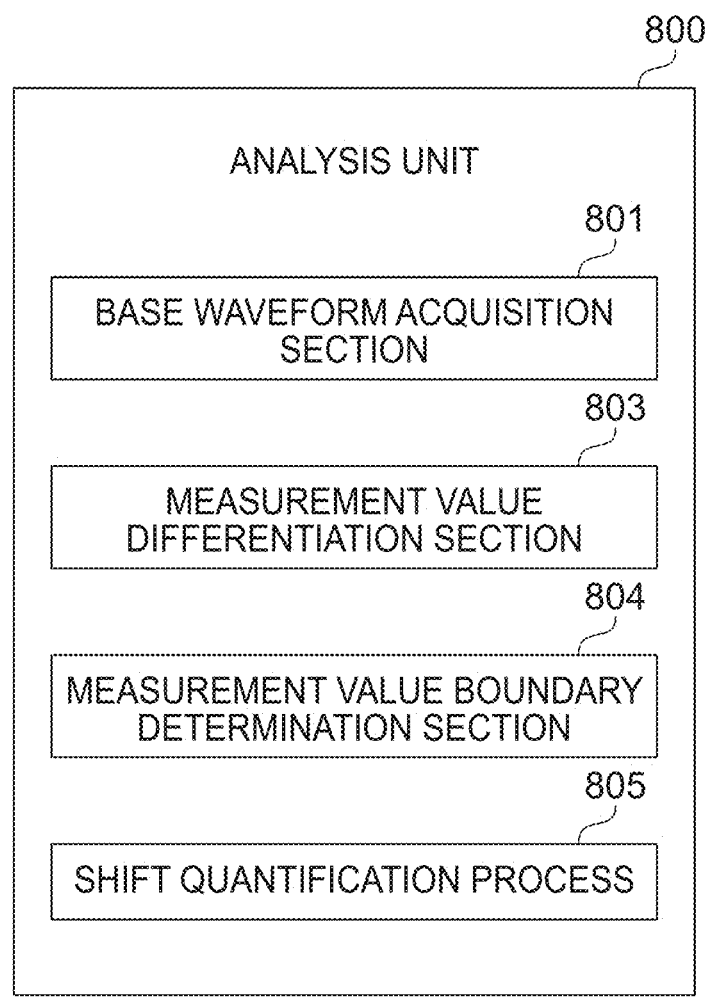
FIG. 13 is a block diagram that illustrates a functional configuration of an analysis unit of a third aspect.

A functional configuration of the analysis unit 800 of the present aspect is illustrated in FIG. 13. Explanation follows regarding the component analysis method of the present aspect, with reference to a flowchart of FIG. 14.

Figure 14:
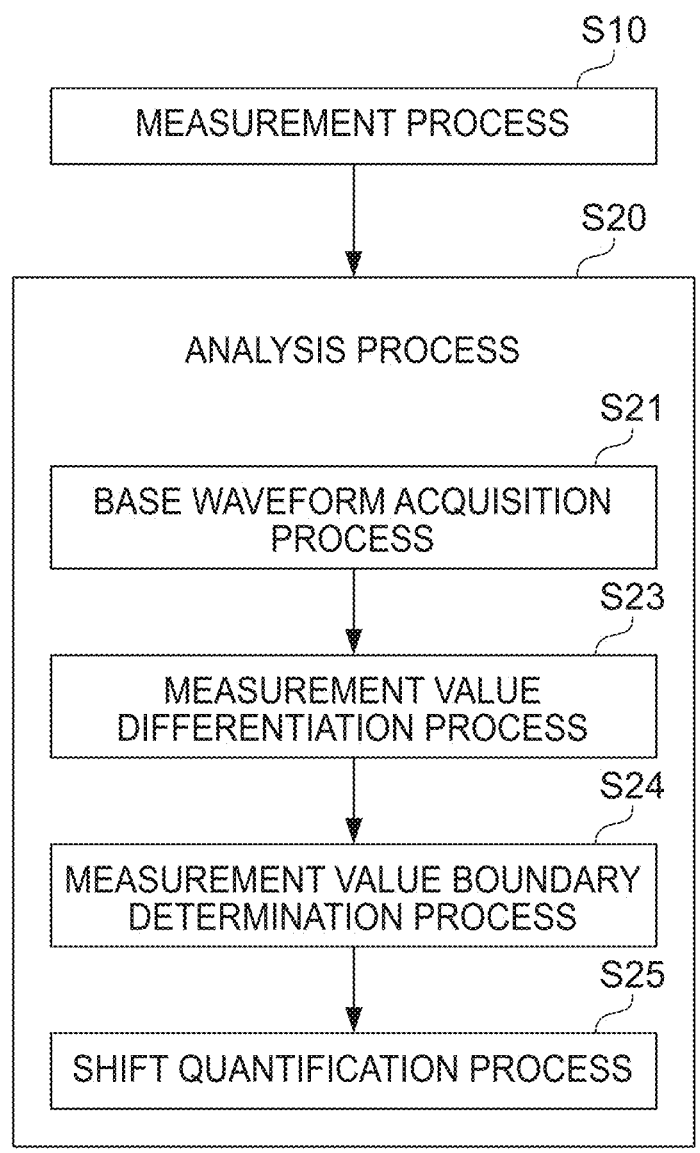
FIG. 14 is a flowchart that schematically illustrates a component analysis method of the third aspect.

The measurement process S10 illustrated in FIG. 14 is similar to that in the first aspect.

In a base waveform acquisition process S21 in the analysis process S20 illustrated in FIG. 14, a base waveform acquisition section 801 in the analysis unit 800 illustrated in FIG. 13 acquires a base waveform by plotting the optical absorbance values as the optical measurement values along one axis (the Y axis, for example) of a two-dimensional plane against a time axis as another axis (the X axis, for example). The base waveform is, for example, represented as a solid line on a graph such as illustrated in FIG. 8. The base waveform acquisition process S21 is similar to that of the first aspect.

Figure 15:
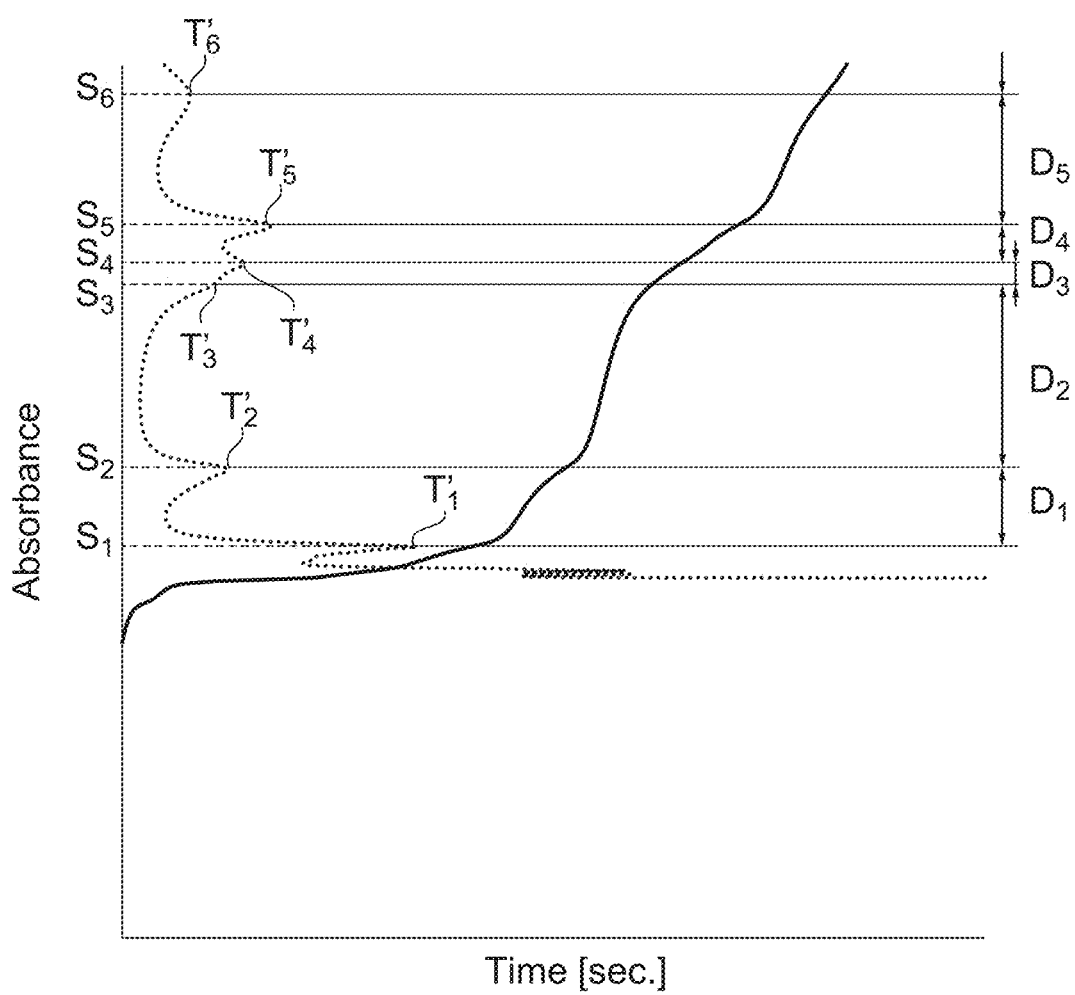
FIG. 15 illustrates a measurement value differentiated waveform with respect to the base waveform of FIG. 8 illustrated as a dotted line.

Then, in a measurement value differentiation process S23 in the analysis process S20 illustrated in FIG. 14, a measurement value differentiation section 803 in the analysis unit 800 illustrated in FIG. 13 differentiates the base waveform along the optical measurement value axis to acquire a measurement value differentiated waveform such as illustrated by the dotted line on the graph in FIG. 15. The measurement value differentiated waveform is also similar to that of the first aspect.

Next in a measurement value boundary determination process S24 in the analysis process S20 illustrated in FIG. 14, a measurement value boundary determination section 804 in the analysis unit 800 illustrated in FIG. 13 determines optical measurement values S1 to S6 respectively corresponding to the peaks T1' to T6' in FIG. 15 to be separation boundaries between components.

Then, in a shift quantification process S25 in the analysis process S20 illustrated in FIG. 14, a shift quantification process 805 in the analysis unit 800 illustrated in FIG. 13, without acquiring a time differentiated waveform, calculates relative amounts of components in the sample Sa based on distances D1 to D5 that are intervals demarcated by separation boundaries S1 to S6, which respectively correspond to the peaks T1' to T6' determined in a similar manner to in the first aspect, as illustrated in FIG. 15. Note that the distances of intervals D1 to D5 illustrated in FIG. 15 correspond to the areas of the peak waveforms P1 to P5 illustrated in FIG. 10. In the shift quantification process S25, It is not necessary to refer to a time differentiated waveform at all.

Fourth Aspect

A component analysis method of a fourth aspect of the present disclosure includes a measurement process S10 and an analysis process S20. In the measurement process S10, a sample solution that is continuously introduced into a flow path 27 is separated into a plurality of components inside the flow path 27 and is optically measured over time at a measurement position 27A on the flow path 27 to obtain optical measurement values. In the analysis process S20, the plurality of components contained in a sample Sa is analyzed based on the optical measurement values. The analysis process S20 includes: a base waveform acquisition process S21 in which a base waveform is acquired by plotting the optical measurement values along a time axis on a two-dimensional plane; a time differentiation process S22 in which a time differentiated waveform is acquired, which is a waveform obtained by differentiating the base waveform along the time axis; a reciprocal differentiation process S26 in which a reciprocal differentiated waveform is acquired, which is a waveform obtained by plotting reciprocals of the time differentiated waveform along the time axis; and a time boundary determination process S27 in which time points corresponding to peaks in the reciprocal differentiated waveform are determined to be separation boundaries between adjacent components in the plurality of components.

A component analysis device 1 of the present aspect includes: a flow path 27 into which a sample solution is continuously introduced; a measurement section 40 that optically measures the sample solution over time, which is separated into a plurality of components inside the flow path 27, at a measurement position 27A on the flow path 27 to obtain optical measurement values; and an analysis unit 800 that analyzes the plurality of components contained in a sample Sa based on the optical measurement values. The analysis unit 800 includes: a base waveform acquisition section 801 that acquires a base waveform by plotting the optical measurement values along a time axis on a two-dimensional plane; a time differentiation section 802 that acquires a time differentiated waveform that is a waveform obtained by differentiating the base waveform along the time axis; a reciprocal differentiation section 806 that acquires a reciprocal differentiated waveform that is a waveform obtained by plotting reciprocals of the time differentiated waveform along the time axis; and a time boundary determination section 807 that determines time points corresponding to peaks in the reciprocal differentiated waveform to be separation boundaries between adjacent components in the plurality of components.

Figure 16:
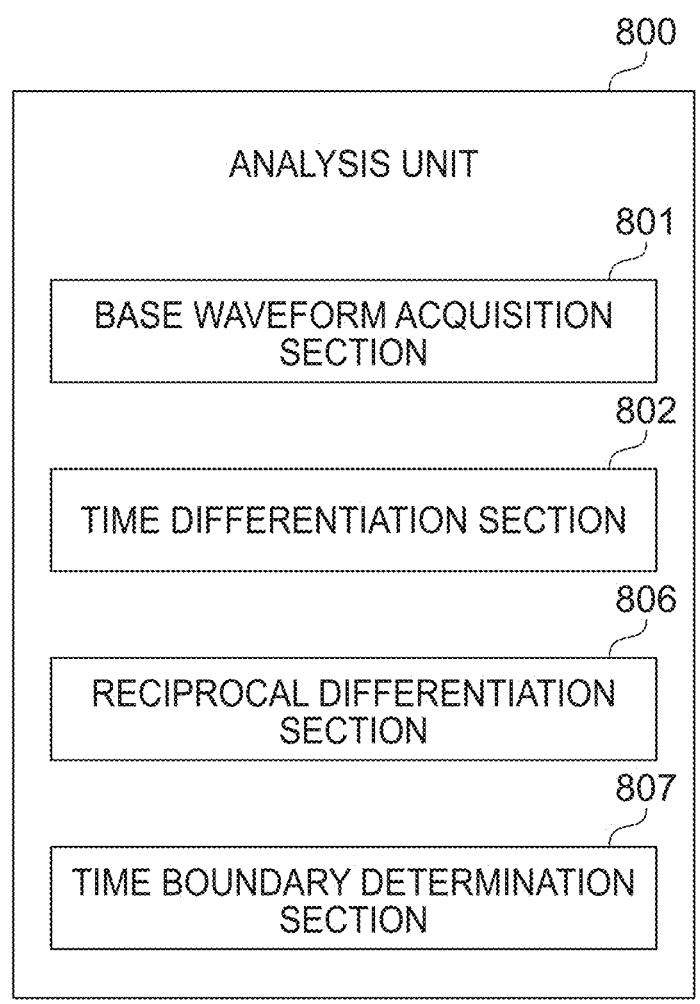
FIG. 16 is a block diagram that illustrates a functional configuration of an analysis unit of a fourth aspect.

A functional configuration of the analysis unit 800 of the present aspect is illustrated in FIG. 16. Explanation follows regarding the component analysis method of the present aspect, with reference to a flowchart of FIG. 17.

Figure 17:
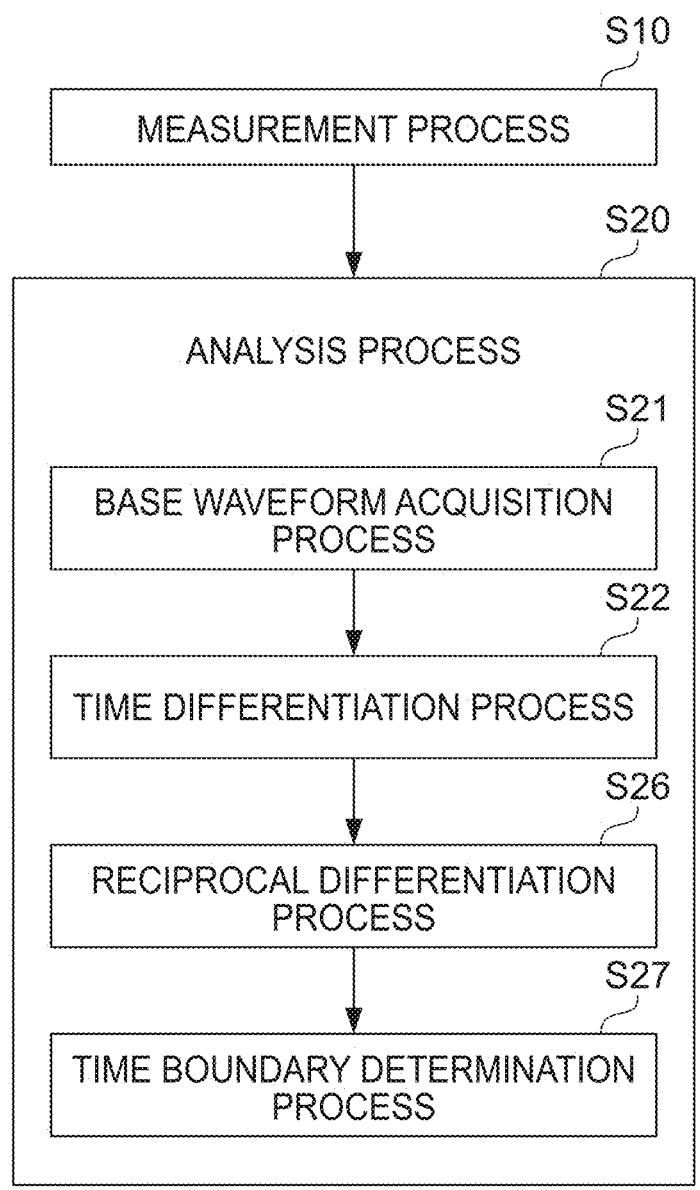
FIG. 17 is a flowchart that schematically illustrates a component analysis method of the fourth aspect.

The measurement process S10 illustrated in FIG. 17 is similar to that in the first aspect.

In a base waveform acquisition process S21 in the analysis process S20 illustrated in FIG. 17, a base waveform acquisition section 801 in the analysis unit 800 illustrated in FIG. 16 acquires a base waveform by plotting the optical absorbance values as the optical measurement values along one axis (the Y axis, for example) of a two-dimensional plane against a time axis as another axis (the X axis, for example). The base waveform is, for example, represented as a solid line on a graph such as illustrated in FIG. 8. The base waveform acquisition process S21 is similar to that of the first aspect. Note that the base waveform may be referred to as a function in which the optical measurement value is plotted with time as a variable.

Next, in a time differentiation process S22 in the analysis process S20 illustrated in FIG. 17, a time differentiation section 802 of the analysis unit 800 illustrated in FIG. 16 acquires a time differentiated waveform that is a waveform obtained by differentiating the base waveform along the time axis. The time differentiated waveform is represented as the solid line on a graph as illustrated in FIG. 9. The relationship between the base waveform and the time differentiated waveform is similar to that mentioned in the first aspect as described above.

Figure 18:
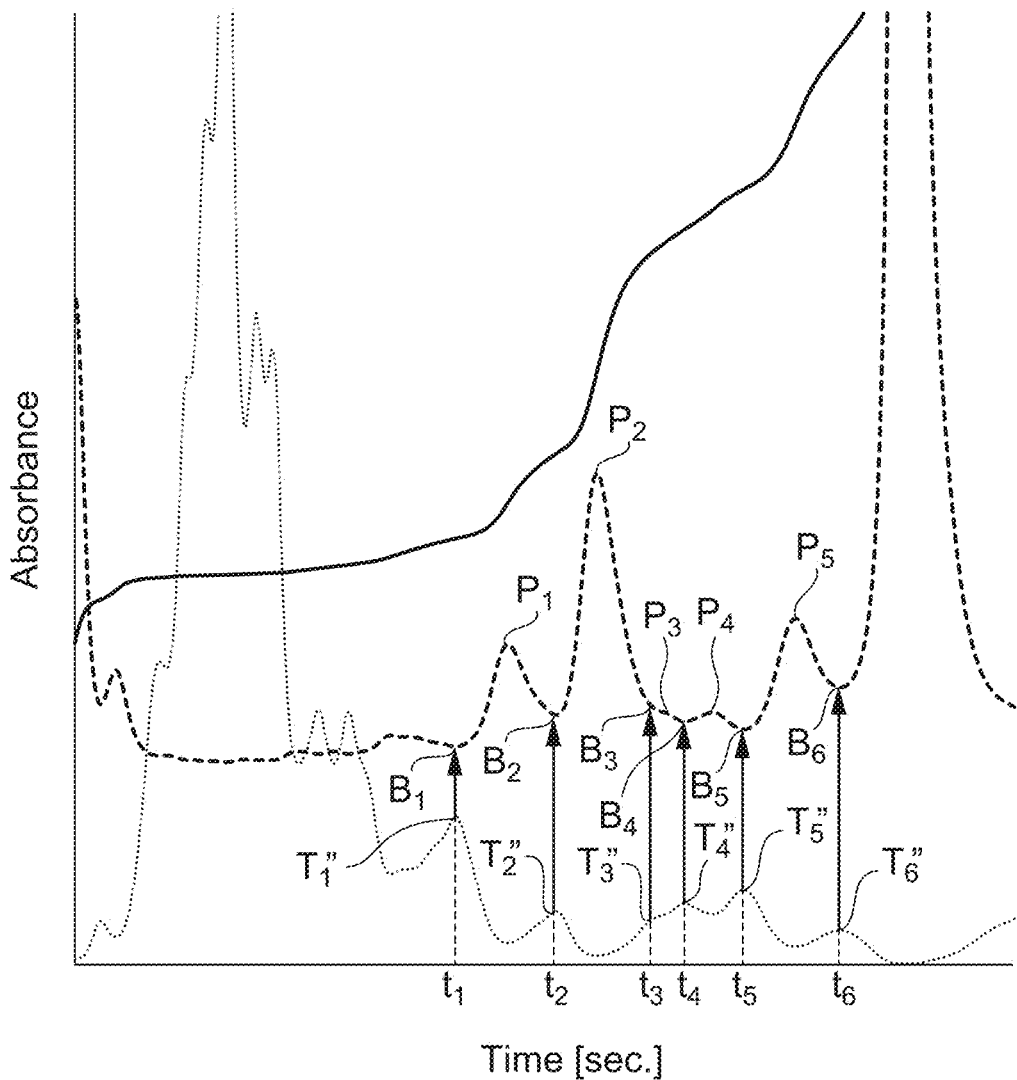
FIG. 18 is chart appended with a reciprocal differentiated waveform with respect to the time differentiated waveform of FIG. 9.

Next, in a reciprocal differentiation process S26 in the analysis process S20 illustrated in FIG. 17, a reciprocal differentiation section 806 of the analysis unit 800 illustrated in FIG. 16 acquires a reciprocal differentiated waveform as illustrated by the dotted line in FIG. 18 by plotting the reciprocal of the optical absorbances of the time differentiated waveform acquired in the time differentiation process S22 along the time axis. Note that, when plotting the reciprocal of the optical absorbance of the time differentiated waveform on a two-dimensional plane having the optical measurement values as one axis and the time axis as the other axis, it is sufficient to plot relative values that are precise enough to clearly correspond to the time differentiated waveform, and it is not necessary to plot absolute values. Note that the reciprocals of the optical absorbances may also be acquired as data that are capable of being plotted on a two-dimensional plane, and it is not necessary to actually draw a graph based on such data.

Note that the peaks and bottoms on the time differentiated waveform respectively correspond to the bottoms and peaks on the reciprocal differentiated waveform, similarly to the measurement value differentiated waveform described in the first aspect. Thus, as illustrated in FIG. 18, peaks T1" to T6" of the reciprocal differentiated waveform respectively correspond to bottoms B1 to B6 in the time differentiated waveform. In other words, the bottoms B1 to B6 in the time differentiated waveform appear distinctly as the respective peaks T1" to T6" in the reciprocal differentiated waveform.

Namely, in a time boundary determination process S27 in the analysis process S20 illustrated in FIG. 17, a time boundary determination section 807 in the analysis unit 800 illustrated in FIG. 16 determines the time points t1 to t6 respectively corresponding to the peaks T1" to T6" in the reciprocal differentiated waveform to be separation boundaries between components.

The configuration of the fourth aspect as described above enables the bottoms B1 to B6, which are hitherto needed to be discriminated as the two ends of a peak waveform in the time differentiated waveform, can be respectively identified as the respective peaks T1" to T6" of the reciprocal differentiated waveform. Then, it is possible for the time points t1 to t6 corresponding to the peaks T1" to T6" to be respectively determined to be the separation boundaries between components contained in the sample Sa.

Fifth Aspect

A component analysis method of an fifth aspect of the present disclosure is an augmented configuration of the component analysis method of the fourth aspect, wherein the analysis process S20 further includes an integral quantification process S28 in which a value obtained by integrating the time differentiated waveform for an integration interval whose both ends are adjacent two integration boundaries, wherein time points corresponding to the separation boundaries are determined to be integration boundaries for the time differentiated waveform, is calculated as a relative amount of each component in the sample Sa corresponding to the integration intervals.

The component analysis device 1 of the present aspect is an augmented configuration of the component analysis device 1 of the fourth aspect, wherein the analysis unit 800 further includes an integral quantification section 808 that calculates values obtained by integrating the time differentiated waveform for an integration interval whose both ends are adjacent two integration boundaries, wherein time points corresponding to the separation boundaries are determined to be integration boundaries for the time differentiated waveform, as a relative amount of the component in the sample Sa corresponding to the integration intervals.

Figure 19:
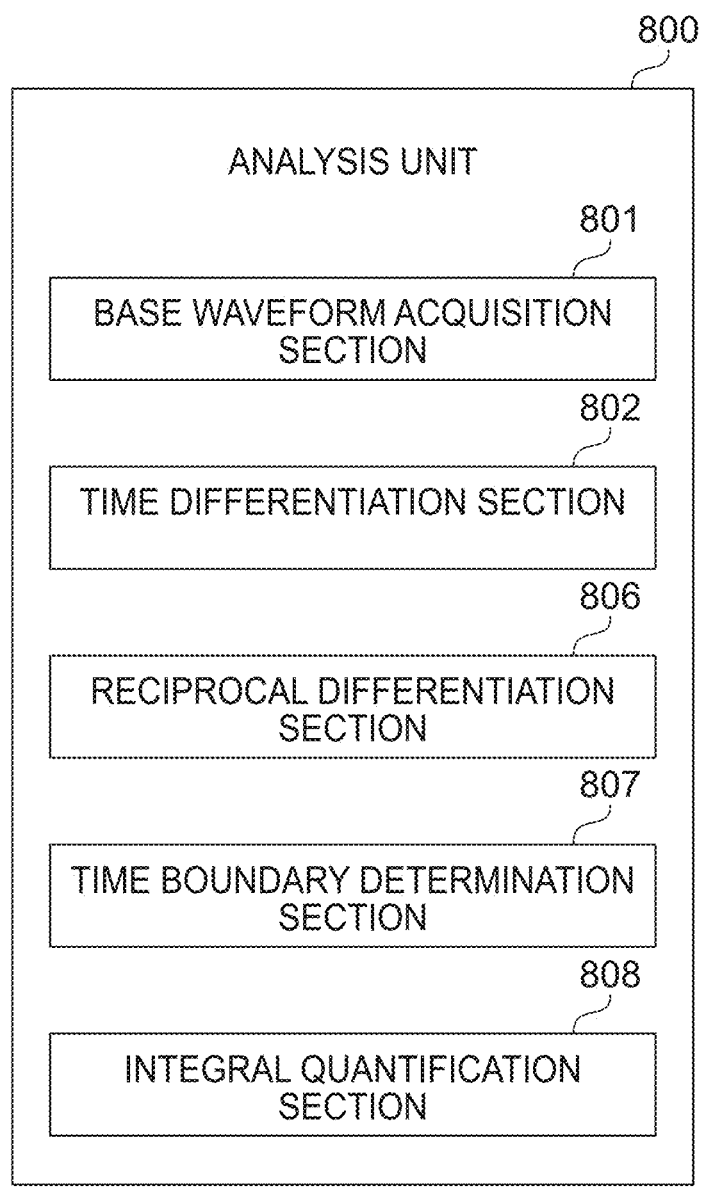
FIG. 19 is a flowchart that represents a functional configuration of an analysis unit of a fifth aspect.

A functional configuration of the analysis unit 800 of the present aspect is illustrated in FIG. 19. Explanation next follows regarding the component analysis method of the present aspect, with reference to a flowchart of FIG. 20. However, the measurement process S10, and the base waveform acquisition process S21, the time differentiation process S22, the reciprocal differentiation process S26, and the time boundary determination process S27 in the analysis process S20 illustrated in FIG. 20 are similar to those of the fourth aspect.

In the time boundary determination process S27 illustrated in FIG. 20, in FIG. 18, the time points t1 to t6 respectively corresponding to the peaks T1" to T6" determined in the fourth aspect are the separation boundaries respectively corresponding to the bottoms B1 to B6, and the time points t1 to t6 as these separation boundaries are respectively determined to be integration boundaries. Then, in an integral quantification process S28 in the analysis process S20 illustrated in FIG. 20, an integral quantification section 808 in the analysis unit 800 illustrated in FIG. 19 integrates the time differentiated waveform for each integration interval whose both ends are adjacent two integration boundaries, and thereby calculates an area occupied by the time differentiated waveform in each integration interval. The value obtained for the areas can be regarded as relative amount of components corresponding to the integration intervals (namely, the component appearing as a peak waveform in the time differentiated waveform).

An important point here is that, although the bottom B3 in FIG. 18 does not always appear as a distinct minimal value in the time differentiated waveform, the peak T3" corresponding thereto in the reciprocal differentiated waveform can be distinctly identified as a so-called shoulder peak in the graph. Therefore, the time t3 corresponding to bottom B3 can be distinctly determined to be the integration boundary t3. Then, integrating the time differentiated waveform for an integration interval whose both ends are the integration boundary t3 and the adjacent integration boundary t4 enables the relative amount to be calculated for a peak waveform P3 which does not always appear as a distinct peak. Of course, for the other peak waveforms Pb, P2, P4 and P5 that do appear as distinct peaks, the respective relative amounts thereof can also be calculated by respectively integrating the time differentiated waveform in a similar manner using respective integration intervals of t1 to t2, t2 to t3, t4 to t5, and t5 to t6.

Others

As another exemplary embodiment of the present invention, there are also examples of component analysis methods other than capillary electrophoresis, such as one in which another method (for example, chromatography) is adopted to separate the sample solution when the sample solution is introduced into the flow path by using a method different to applying a voltage, and in which measurement is performed with a flow path of larger width than the capillary tube described above.

EXAMPLES

An example of a case in which blood of an examinee is employed as the sample Sa will now be used to illustrate advantageous effects of the present exemplary embodiment with respect to the effects on identifying peak waveforms of high and low ambient temperature and high and low concentrations of a specimen during measurement.

Figure 21A:
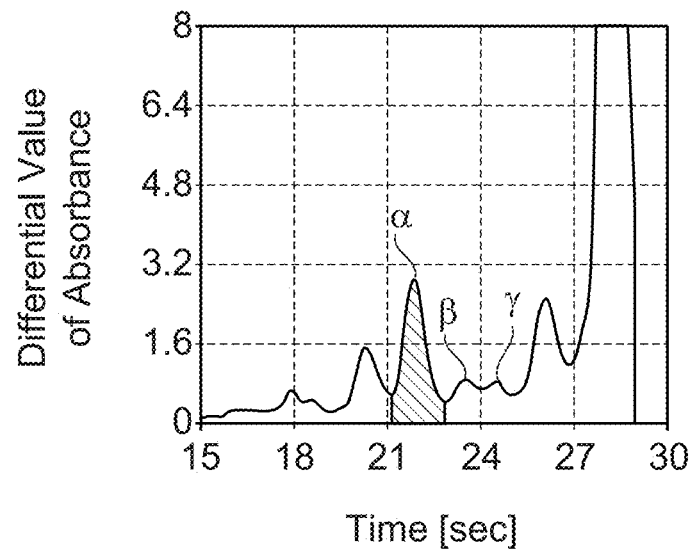
FIG. 21A to FIG. 21D are charts that illustrate effects of high and low ambient temperatures and high and low concentrations of a specimen during measurement on a time differentiated waveform obtained by a time differentiation process.
Figure 21B:
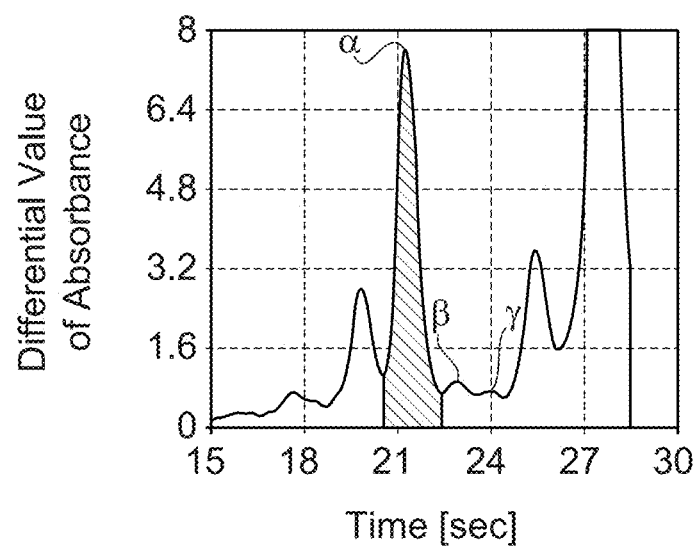
Figure 21C:
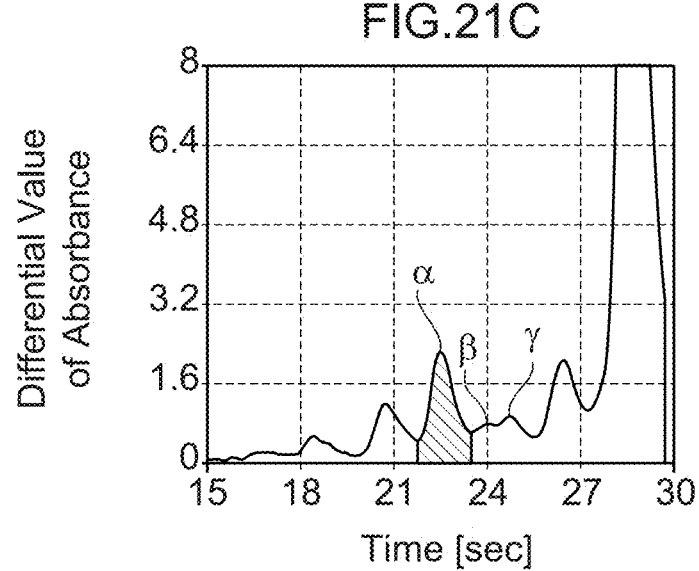
Figure 21D:
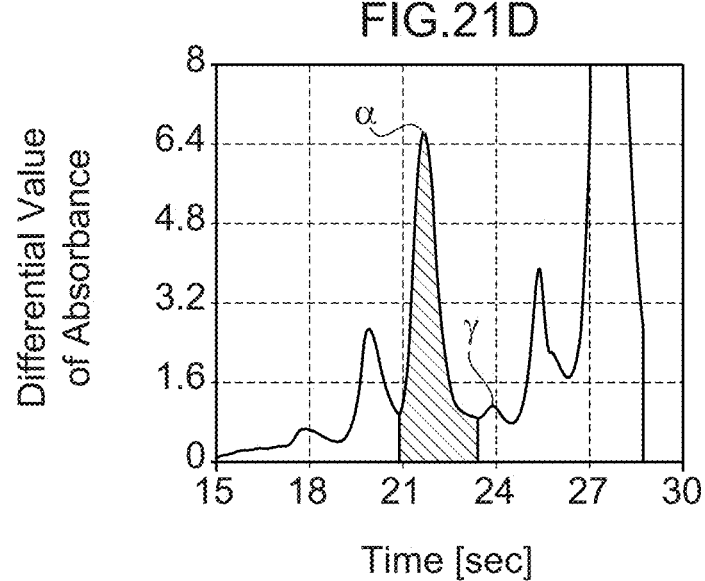

FIG. 21A to FIG. 21D illustrate the effects of high and low ambient temperature and high and low concentrations of a specimen during measurement for a time differentiated waveform obtained by the time differentiation process S22. In FIG. 21A to FIG. 21D, each vertical axis represents differential values of absorbance. The ambient temperature in FIG. 21A and FIG. 21B was 23° C., and the ambient temperature in FIG. 21C and FIG. 21D was 8° C. The sample Sa used in FIG. 21A and FIG. 21C was previously diluted by about three times (referred to as a low concentration sample), and the sample Sa used in FIG. 21B and FIG. 21D is not diluted (referred to as a high concentration sample). In each of the drawings, a peak α corresponds to hemoglobin variant HbA1c, and a region demarcated by distinct bottoms appearing at each end is illustrated by hatching.

At normal ambient temperature as in FIG. 21A and FIG. 21B, the bottom portion acting as the boundary to a peak β adjacent on the lower migration speed side (namely, the right hand side) was distinct, irrespective of the high or low concentration of the sample Sa.

However, as illustrated in FIG. 21C and FIG. 21D, the peak α and the peak β tended to approach each other when the ambient temperature was 8° C., making the boundary between the mutually adjacent peak α and peak β somewhat indistinct. In particular, when there was a high concentration sample as in FIG. 21D, the peak β was absorbed into the peak α and becomes undiscernible. In cases in which an attempt is made to divide a peak waveform in such a state simply by using the distinct bottoms at the two sides thereof, then a boundary to a peak γ even further to the lower migration speed side is used therefor, resulting in the region applied with hatching being used for quantification of the content of the peak α. However, this region actual includes the peak β. Thus, when a high concentration sample is measured at a low ambient temperature, the quantified content of the component corresponding to an identified peak may possibly be calculated to be higher than is really the case.

FIG. 22A to FIG. 22D illustrate respective time differentiated waveforms, similarly to those of FIG. 21A to FIG. 21D. In FIG. 22A to FIG. 22D, each vertical axis represents differential values of absorbance. However, each of the peak α illustrated with hatching is a region demarcated by integration boundaries determined by the measurement value differentiation process S23 based on the non-illustrated base waveform, the measurement value boundary determination process S24, and the integral quantification process S28.

Figure 22A:
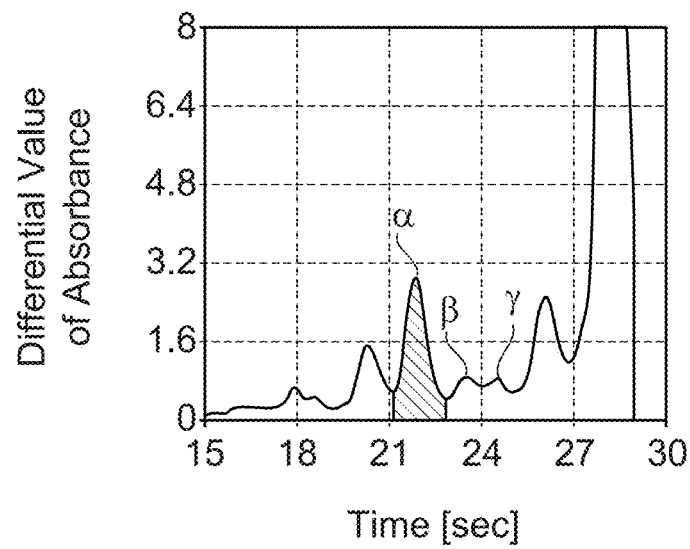
FIG. 22A to FIG. 22D are charts that illustrate effects of high and low ambient temperatures and high and low concentrations of a specimen during measurement on a time differentiated waveform obtained by a time differentiation process.
Figure 22B:
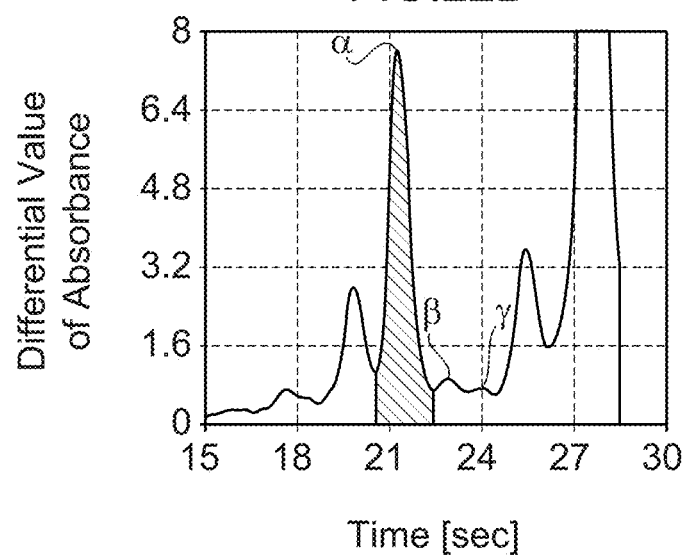
Figure 22C:
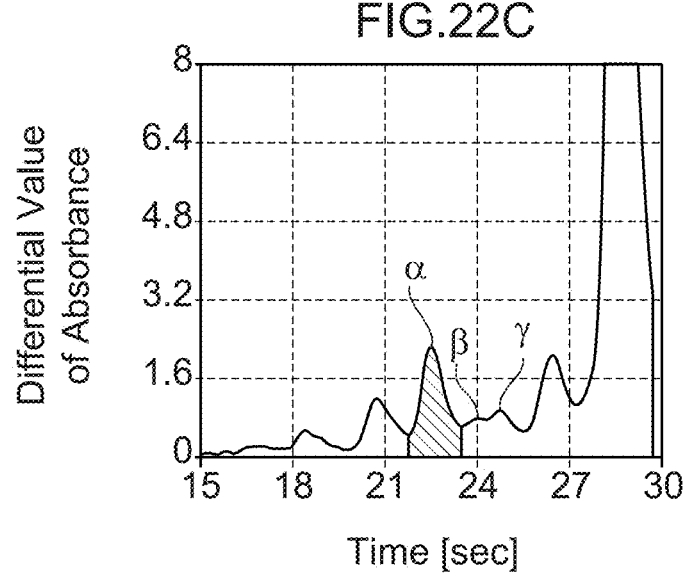
Figure 22D:
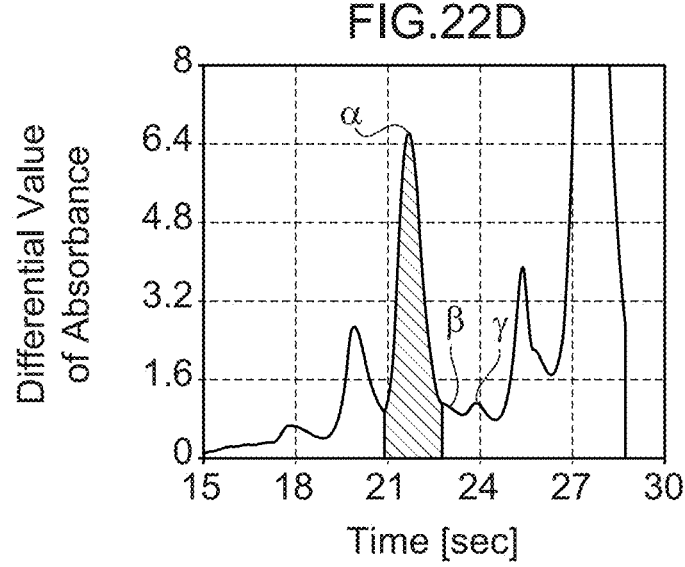

The regions identified as the peak α in FIG. 22A, FIG. 22B, and FIG. 22C did not differ from the corresponding regions in FIG. 21A, FIG. 21B, and FIG. 21C. However, in FIG. 22D, a boundary between the peak α and the peak β, which was fused with the peak as in FIG. 21D, could be made distinct, enabling calculation of content quantification that appeared to be appropriate by comparing the identified region therein to the peak α in the other drawings.

It is thus apparent that the above exemplary embodiment enables a correct peak waveform to be identified even in cases in which a high concentration sample is measured at a low ambient temperature, such that it is possible to correctly quantify the components contained in the sample.

INDUSTRIAL APPLICABILITY

The invention of the present application is applicable to a component analysis system using continuous sample introduction, and is particularly applicable to a component analysis system using capillary electrophoresis.

What is claimed is:

1. A component analysis method comprising:
   a measurement process in which a sample solution that is continuously introduced into a flow path is separated into a plurality of components inside the flow path and is optically measured over time at a measurement position on the flow path to obtain optical measurement values; and
   an analysis process in which the plurality of components contained in a sample is analyzed based on the optical measurement values, the analysis process including:
      a base waveform acquisition process in which a base waveform is acquired by plotting the optical measurement values against a time axis on a two-dimensional plane;
      a measurement value differentiation process in which a measurement value differentiated waveform is acquired, which is a waveform obtained by differentiating the base waveform with respect to the optical measurement value along an axis of the optical measurement values; and
      a measurement value boundary determination process in which the optical measurement values corresponding to peaks in the measurement value differentiated waveform are determined to be separation boundaries between adjacent components of the plurality of components.

2. The component analysis method of claim 1, wherein the analysis process further includes:
   a time differentiation process in which a time differentiated waveform is acquired, which is a waveform obtained by differentiating the base waveform along the time axis; and
   an integral quantification process in which, a value obtained by integrating the time differentiated waveform for an integration interval whose both ends are adjacent two integration boundaries, wherein time points corresponding to the separation boundaries are determined to be integration boundaries for the time differentiated waveform, is calculated as a relative amount of each component in the sample corresponding to the integration interval.

3. The component analysis method of claim 1, wherein the analysis process further includes a shift quantification process in which a distance of each interval whose both ends are adjacent two separation boundaries along the axis of the optical measurement values is calculated as a relative amount of each component in the sample corresponding to the interval.

4. The component analysis method of claim 1, wherein the optical measurement values are obtained using capillary electrophoresis in which a voltage is applied to the sample solution being continuously introduced into a capillary tube as the flow path so as to separate the plurality of components in the sample solution.

5. The component analysis method of claim 1, wherein the plurality of components includes hemoglobin.

6. The component analysis method of claim 1, wherein the base waveform includes a high-gradient portion that indicates arrival of at least one of the plurality of components at the measurement position on the flow path.

7. A component analysis method comprising:
   a measurement process in which a sample solution that is continuously introduced into a flow path is separated into a plurality of components inside the flow path and is optically measured over time at a measurement position on the flow path to obtain optical measurement values; and
   an analysis process in which the plurality of components contained in a sample is analyzed based on the optical measurement values, the analysis process including:
      a base waveform acquisition process in which a base waveform is acquired by plotting the optical measurement values against a time axis on a two-dimensional plane;
      a time differentiation process in which a time differentiated waveform is acquired, which is a waveform obtained by differentiating the base waveform with respect to time along the time axis;
      a reciprocal differentiation process in which a reciprocal differentiated waveform is acquired, which is a waveform obtained by plotting reciprocals of the time differentiated waveform along the time axis; and
      a time boundary determination process in which time points corresponding to peaks in the reciprocal differentiated waveform are determined to be separation boundaries between adjacent components in the plurality of components.

8. The component analysis method of claim 7, wherein the analysis process further includes an integral quantification process in which a value obtained by integrating the time differentiated waveform for an integration interval whose both ends are adjacent two integration boundaries, wherein time points corresponding to the separation boundaries are determined to be integration boundaries for the time differentiated waveform, is calculated as a relative amount of each component in the sample corresponding to the integration intervals.

9. The component analysis method of claim 7, wherein the plurality of components includes hemoglobin.

10. The component analysis method of claim 7, wherein the base waveform includes a high-gradient portion that indicates arrival of at least one of the plurality of components at the measurement position on the flow path.

11. A component analysis device comprising:
   a flow path into which a sample solution is continuously introduced; and
   a processing unit comprising hardware configured to execute a program to implement:
      a measurement section that optically measures the sample solution over time, which is separated into a plurality of components inside the flow path, at a measurement position on the flow path to obtain optical measurement values; and
      an analysis unit that analyzes the plurality of components contained in a sample based on the optical measurement values, the analysis unit including:

a base waveform acquisition section that acquires a base waveform by plotting the optical measurement values against a time axis on a two-dimensional plane;

a measurement value differentiation section that acquires a measurement value differentiated waveform that is a waveform obtained by differentiating the base waveform with respect to the optical measurement value along an axis of the optical measurement values; and a measurement value boundary determination section that determines optical measurement values corresponding to peaks in the measurement value differentiated waveform to be separation boundaries between adjacent components into the plurality of components.

12. The component analysis device of claim 11, wherein the analysis unit further includes:

a time differentiation section that acquires a time differentiated waveform that is a waveform obtained by differentiating the base waveform along the time axis; and an integral quantification section that calculates, a value obtained by integrating the time differentiated waveform for each integration interval whose both ends are adjacent two integration boundaries, wherein time points corresponding to the separation boundaries are determined to be integration boundaries for the time differentiated waveform, as a relative amount of each component in the sample corresponding to the integration interval.

13. The component analysis device of claim 11, wherein the analysis unit further includes a shift quantification section that calculates a distance of each interval whose both ends are adjacent two separation boundaries along the axis of the optical measurement values is calculated as a relative amount of each component in the sample solution corresponding to the interval.

14. The component analysis device of claim 11, wherein the plurality of components includes hemoglobin.

15. The component analysis device of claim 11, wherein the base waveform includes a high-gradient portion that indicates arrival of at least one of the plurality of components at the measurement position on the flow path.

16. A component analysis device comprising:

a flow path into which a sample solution is continuously introduced; and a processing unit comprising hardware configured to execute a program to implement:

a measurement section that optically measures the sample solution over time, which is separated into a plurality of components inside the flow path, at a measurement position on the flow path to obtain optical measurement values; and an analysis unit that analyzes the plurality of components contained in a sample based on the optical measurement values, the analysis unit including:

a base waveform acquisition section that acquires a base waveform by plotting the optical measurement values against a time axis on a two-dimensional plane;

a time differentiation section that acquires a time differentiated waveform that is a waveform obtained by differentiating the base waveform with respect to time along the time axis;

a reciprocal differentiation section that acquires a reciprocal differentiated waveform that is a waveform obtained by plotting reciprocals of the time differentiated waveform along the time axis; and a time boundary determination section that determines time points corresponding to peaks in the reciprocal differentiated waveform to be separation boundaries between adjacent components in the plurality of components.

17. The component analysis device of claim 16, wherein the analysis unit further includes an integral quantification section that calculates a value obtained by integrating the time differentiated waveform for an integration interval whose both ends are adjacent two integration boundaries, wherein time points corresponding to the separation boundaries are determined to be integration boundaries for the time differentiated waveform, as a relative amount of each component in the sample corresponding to the integration interval.

18. The component analysis device of claim 16, wherein the plurality of components includes hemoglobin.

19. The component analysis device of claim 16, wherein the base waveform includes a high-gradient portion that indicates arrival of at least one of the plurality of components at the measurement position on the flow path.

20. The component analysis device of claim 16, wherein the sample solution is separated into the plurality of components inside the flow path based on capillary electrophoresis.

* * * * *